(12) United States Patent
Sato et al.

(10) Patent No.: US 6,898,055 B2
(45) Date of Patent: May 24, 2005

(54) THIN-FILM MAGNETIC HEAD DESIGNED FOR NARROWER TRACKS

(75) Inventors: Kiyoshi Sato, Niigata-ken (JP); Toshinori Watanabe, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 181 days.

(21) Appl. No.: 10/277,528

(22) Filed: Oct. 22, 2002

(65) Prior Publication Data

US 2003/0076630 A1 Apr. 24, 2003

(30) Foreign Application Priority Data

Oct. 23, 2001 (JP) ........................................ 2001-324792

(51) Int. Cl.⁷ .............................................. G11B 5/147
(52) U.S. Cl. ........................................................ 360/126
(58) Field of Search ................................. 360/126, 125, 360/119, 120, 110

(56) References Cited

U.S. PATENT DOCUMENTS

| | | | |
|---|---|---|---|
| 5,452,164 A | 9/1995 | Cole et al. ................. | 360/317 |
| 6,091,582 A | 7/2000 | Komuro et al. ............. | 360/126 |
| 6,151,193 A | 11/2000 | Terunuma et al. .......... | 360/126 |
| 6,407,885 B1 * | 6/2002 | Ahagon et al. ............. | 360/126 |
| 6,538,845 B1 * | 3/2003 | Watanabe et al. ........... | 360/126 |
| 6,721,132 B2 * | 4/2004 | Narumi et al. .............. | 360/126 |
| 2002/0071209 A1 * | 6/2002 | Watanabe et al. ........... | 360/126 |
| 2003/0202278 A1 * | 10/2003 | Chen et al. ................. | 360/126 |

FOREIGN PATENT DOCUMENTS

JP    2001-52309    2/2001

* cited by examiner

Primary Examiner—Julie Anne Watko
(74) Attorney, Agent, or Firm—Brinks Hofer Gilson & Lione

(57) ABSTRACT

A thin-film magnetic head has a second lower core layer sandwiched between a magnetic pole laminate, which is formed of a lower magnetic pole layer, a gap layer, and an upper magnetic pole layer laminated in this order from bottom to top, and a first lower core layer. Unlike a conventional thin-film magnetic head, this thin-film magnetic head does not include a gap depth defining layer. This arrangement makes it possible to easily form the magnetic pole laminate into a substantially rectangular shape, and solves the problems with the conventional thin-film magnetic head attributable to the presence of the gap depth defining layer, the problems being typically represented by a curved gap layer or a reduced volume of the upper magnetic pole layer. Thus, the intensity of a recording magnetic field in the vicinity of a gap can be stabilized and increased, allowing the manufacture of thin-film magnetic heads capable of successfully achieving narrower tracks.

9 Claims, 12 Drawing Sheets

FRONT EDGE SURFACE OF THIN-FILM MAGNETIC HEAD

THIN-FILM MAGNETIC HEAD DESIGNED FOR NARROWER TRACKS

BACKGROUND OF THE INVENTION

1. Field of the Invention

The present invention relates to a thin-film magnetic head for recording that is used with, for example, a flying magnetic head or a contact magnetic head and, more particularly, to a thin-film magnetic head capable of properly supporting narrower tracks to successfully cope with the trend toward a higher recording density, and a manufacturing method for the same.

2. Description of the Related Art

With the recent trend toward higher recording densities, there has been a demand for a structure of a thin-film magnetic head for recording known as "an inductive head" that is capable of restraining the occurrence of side fringing, in particular, in achieving narrower tracks. The side fringing refers to the magnetic field leakage in the direction of a track width.

Conventionally, there have been, for example, the following two feasible structures for the inductive head capable of properly restraining the occurrence of the side fringing.

FIG. 16 is a partial longitudinal sectional view showing the structure of a conventional inductive head. The term "longitudinal section" means a section taken in a direction parallel to the plane formed along axis Y and axis Z shown in the drawing. The same applies hereinafter.

A lower core layer 1 is formed of a NiFe-based alloy or the like. A gap depth (Gd) defining layer 2 formed of a resist or the like is deposited on the lower core layer 1. The Gd defining layer 2 has, for example, a semi-elliptical longitudinal section, as shown in FIG. 16. The gap depth (Gd) is determined by the distance from a front edge surface 2a of the Gd defining layer 2 to the front edge surface of the thin-film magnetic head. It has been considered that recording characteristics typically represented by overwrite characteristics can be improved by forming the Gd defining layer 2 so as to narrow a recording magnetic field at the neighborhood of the gap.

In the structure shown in FIG. 16, a magnetic pole laminate 6, which is constituted by a lower magnetic layer 3, a gap layer 4, and an upper magnetic pole layer 5 that are deposited in this order from bottom to top, is formed on the lower core layer 1, extending from the front edge surface of the thin-film magnetic head onto the Gd defining layer 2 in the height direction (direction Y shown in the drawing). At the rear end side of the magnetic pole laminate 6, an insulating layer 7 formed of $Al_2O_3$ or the like is deposited in the height direction.

A coil layer 8 is formed such that it wraps the insulating layer 7, the coil layer 8 being covered by an organic insulating material layer 9.

A upper core layer 10 made of a magnetic material is deposited such that it extends from the top of the upper magnetic pole layer 5 constituting the magnetic pole laminate 6 to the top of the organic insulating material layer 9. A proximal end portion 10b of the upper core layer 10 is magnetically connected onto the lower core layer 1.

In the inductive head having the construction shown in FIG. 16, a track width Tw is restricted by the width of the upper magnetic pole layer 5 in a track width direction (direction X in the drawing). This width is smaller than the width in the track width direction of a distal end portion 10a of the upper core layer 10. It has been considered that forming the magnetic pole laminate 6 restricting the track width Tw between the upper core layer 10 and the lower core layer 1 makes it possible to properly restrain the occurrence of side fringing and to permit support of narrower tracks.

FIG. 18 is a partial longitudinal sectional view showing the structure of another conventional inductive head. The layers denoted by like reference numerals shown in FIG. 16 indicate the like layers as those shown in FIG. 16.

In the structure illustrated in FIG. 18, a second lower core layer 11 is deposited on the lower core layer 1 such that it extends in the height direction or direction Y in the drawing from the front edge surface of the thin-film magnetic head. An insulating layer 7 is formed at the rear of the second lower core layer 11 in the height direction, and a gap layer 12 formed of an insulating material, such as $Al_2O_3$, is deposited such that it extends from the top of the second lower core layer 11 to the top of the insulating layer 7.

A second upper core layer 13 that extends in the height direction (direction Y in the drawing) for a predetermined length from the front edge surface of the thin-film magnetic head is deposited on the gap layer 12. At the rear of the second upper core layer 13 in the height direction, an insulating layer 14 made of $Al_2O_3$ or the like is formed. Referring to FIG. 18, a rear edge surface 13a of the second upper core layer 13 is positioned farther in the height direction (direction Y in the drawing) than a rear edge surface 11a of the second lower core layer 11. The distance from the front edge surface of the thin-film magnetic head of the second lower core layer 11 to the rear edge surface 11a determines the Gd. The rear edge surface 13a of the second upper core layer 13 has been positioned farther toward the rear in the height direction than the rear edge surface 11a of the second lower core layer 11, as mentioned above, primarily in order to maximize the area of contact between the second upper core layer 13 and the upper core layer 10. This arrangement permits higher magnetic flux efficiency.

A coil layer 8 is formed such that it wraps the insulating layer 14, and the coil layer 8 is covered by an organic insulating material layer 9.

An upper core layer 10 is deposited such that it extends from the top of the second upper core layer 13 to the top of the organic insulating material layer 9. A proximal end portion 10b of the upper core layer 10 is magnetically connected onto the lower core layer 1.

The inductive head having the construction shown in FIG. 18 has been subjected to the processing described below so as to properly restrain side fringing.

Referring to FIG. 19, which is a partial front view of the inductive head of FIG. 18 that is observed from the front edge surface of the thin-film magnetic head or as indicated by the chain line shown in FIG. 18, both symmetrical surfaces 11c in the track width direction (direction X in the drawing) of the second lower core layer 11 are first trimmed by ion milling from substantially vertical direction A with respect to the surface of the lower core layer 1 (hereinafter referred to as "depth trimming") so as to form a projection 11b, which projects toward the second upper core layer 13, on the second lower core layer 11. Thereafter, the materials adhered again to both side edge surfaces 13b in the track width direction (direction X in the drawing) of the second upper core layer 13 are removed. Then, ion milling is carried out from a direction B aslant with respect to the direction perpendicular to the surface of the lower core layer 1 in order to form further narrower tracks. This ion milling will be hereinafter referred to as "side trimming." Thus, both symmetrical surfaces 11c of the second lower core layer 11 are provided with slant surfaces in which the thickness of the second lower core layer 11 gradually decreases as the distance from the proximal end of the projection 11b increases in the track width direction (direction X in the drawing).

In the inductive heads of the types shown in FIG. 18 and FIG. 19, respectively, the track width Tw is restricted by the width in the track width direction (direction X in the drawing) of the second upper core layer 13. The second lower core layer 11 has the projection 11b located at the position opposing the second upper core layer 13. The constructions of the inductive heads shown in FIGS. 18 and 19 have been therefore considered to permit proper support of narrower tracks to properly restrain the occurrence of side fringing.

Successfully achieving narrower tracks requires restraint of the occurrence of side fringing mentioned above and a recording magnetic field that has higher intensity in the vicinity of a gap and has stable intensity. Unless these conditions are satisfied, recording characteristics, including an overwrite characteristic, deteriorate, making it impossible to fabricate a thin-film magnetic head for higher recording densities that exhibit effective compatibility with narrower tracks.

It has been found, however, that the inductive heads having the two structures described above both pose problems with the intensity of a recording magnetic field in the vicinity of a gap or with the stability of the recording magnetic field.

FIG. 17 is a partial enlarged longitudinal sectional view showing the structure of the neighborhood of the magnetic pole laminate 6 of the inductive head shown in FIG. 16. FIG. 17 illustrates a step of the process for forming the magnetic pole laminate 6.

Referring to FIG. 17, a Gd defining layer 2 made of a resist or the like is deposited on the lower core layer 1, then a resist layer 15 pattern-formed by exposure and development is deposited from the middle of the top of the Gd defining layer 2 to the top of the lower core layer 1.

Within the pattern formed on the resist layer 15, a lower magnetic pole layer 3, a gap layer 4, and an upper magnetic pole layer 5 are successively formed by plating in this order from bottom to top. In this case, the Gd defining layer 2 is made of an insulating material, such as a resist, so that plating growth is not very successful in the vicinity of a rear end 3a on the Gd defining layer 2 of the lower magnetic pole layer 3. As a result, the area in the vicinity of the rear end 3a of the lower magnetic pole layer 3 becomes extremely thin, and hence, the lower magnetic pole layer 3 is undesirably formed to have a curved surface.

Accordingly, a rear end 4a of a gap layer 4 formed by plating on the lower magnetic pole layer 3 is also curvedly formed.

Essentially, the gap layer 4 should be formed to have a flat surface in the direction parallel to the surface of the lower core layer 1. However, the structure having the Gd defining layer 2 shown in FIG. 16 tends to cause the gap layer 4 to be curvedly formed, presenting the problem of unstable recording characteristics.

Furthermore, as shown in FIG. 17, a rear end 5a of the upper magnetic pole layer 5 formed to extend farther in the height direction (direction Y in the drawing) than the gap layer 4 onto the Gd defining layer 2 at the rear is formed on the Gd defining layer 2. Hence, the rear end 5a of the upper magnetic pole layer 5 cannot be grown by plating to a proper thickness. The rear end 5a will be extremely thin.

Furthermore, a gap 5b tends to be formed between the rear end 5a of the upper magnetic pole layer 5 and the resist layer 15, as shown in FIG. 17. The gap 5b leads to a smaller area of an upper surface 5c of the upper magnetic pole layer 5 that is to be in contact with a distal end portion 10a of the upper core layer 10. This frequently causes a drop in the intensity of a recording magnetic field leaking from the vicinity of the gap.

Thus, in the step illustrated in FIG. 17, the Gd defining layer 2 for deciding a gap depth is likely to be responsible for a curved gap layer 4 or for a thin rear end 5a of the upper magnetic pole layer 5. This frequently causes the magnetic pole layer to be magnetically saturated, or leads to a smaller area of contact between the upper magnetic pole layer 5 and the upper core layer 10. These factors have been posing the problems with a drop in the intensity or unstable intensity of a recording magnetic field in the vicinity of the gap, frequently resulting in degradation of characteristics, including an overwrite characteristic.

Furthermore, in order to secure, for example, a predetermined volume of the upper magnetic pole layer 5, a resist layer 15 shown in FIG. 17 is formed to be thick and a deep pattern is formed on the resist layer 15. This allows the upper magnetic pole layer 5 formed in the pattern to be thicker. In this case, however, the patterning accuracy in forming the pattern of the magnetic pole laminate 6 in the resist layer 15 is deteriorated, and the pattern is apt to expand in the track width direction, preventing an inductive head capable of supporting narrower tracks from being achieved.

A problem with the structure of the inductive head shown in FIG. 18 will now be described. Referring to FIG. 19, when depth trimming in direction A or side trimming in direction B is carried out, both side edge surfaces 13b and 13b of the second upper core layer 13 are apt to be formed wavily rather than flatly. In addition, a re-adherent film 7a of an insulating layer 7 formed of $Al_2O_3$ or the like tends to remain on the both side edge surfaces 13b.

The wavy side edge surfaces 13b of the second upper core layer 13 described above have led to an unstable track width Tw, preventing the track width Tw from being always a predetermined value.

The problem of the unstable track width Tw described above is considered due to a rear edge surface 13a of the second upper core layer 13 being formed such that it extends farther toward the rear in the height direction from a rear edge surface 11a of the second lower core layer 11, as illustrated in FIG. 18.

FIG. 20 is a partial perspective view showing a step of depth trimming and side trimming. Referring to FIG. 20, the rear end of the second upper core layer 13 is covered by a resist layer 16, then the exposed gap layers 12 on both sides of the second upper core layer 13, which are not covered by the resist layer 16, and a part of the second lower core layer 11 thereunder are trimmed by depth trimming in directions A in the drawing so as to form the projection 11b of the second lower core layer 11.

However, the rear edge surface 13a of the second upper core layer 13 extends farther toward the rear in the height direction beyond the rear edge surface 11a of the second lower core layer 11, so that a rear end region 7a of the insulating layer 7 that expands to the rear end of the second lower core layer 11 is exposed rather than being covered by the resist layer 16 when the aforesaid depth trimming is carried out. Hence, the rear end region 7a of the insulating layer 7 is also trimmed, and an element of the insulating layer 7 that comes flying adheres, in the form of the film 7a made of the above insulating material, to both side edge surfaces 13b of the second upper core layer 13. The amount of the adhesion varies all over the both side edge surfaces 13b of the second upper core layer 13 rather than being constant, thus leading to unstable configurations of the track width.

In the step for narrowing the track width Tw by side trimming in directions B in the drawing, when removing the adherent film 7a by the side trimming, a thinner portion of the adherent film 7a is removed sooner since the thickness of the adherent film 7a varies from one portion to another. As a result, even both side edge surfaces 13b of the second upper core layer 13 are susceptible to the side trimming. Especially because the adherent film 7a is formed of an insulating material and exhibits a slower milling rate, as compared with a magnetic material, in order to effectively remove the adherent film 7a from the second upper core layer 13, it would be necessary to prolong the milling time or to carry out high-energy ion milling. Thus, the both side edge surfaces 13b of the second upper core layer 13 are partially subjected to intense influences by ion milling during the side trimming operation, and the both side edge surfaces 13b are trimmed to be wavy. Moreover, the rear end region 7a of the exposed insulating layer 7 is also trimmed during the side trimming operation, causing the re-adherent film 7a of the insulating layer 7 to stick to the entire both side edge surfaces 13b of the second upper core layer 13. Thus, there has been a problem in that the track width Tw of a predetermined dimension cannot be achieved.

The failure to obtain the track width Tw of a predetermined dimension causes the intensities of recording magnetic fields in the vicinity of gaps to vary from one product to another, preventing improved quality from being accomplished. This has been making it impossible to fabricate an inductive head capable of successfully supporting narrower tracks.

SUMMARY OF THE INVENTION

Accordingly, the present invention has been made with a view toward solving the problems with the prior art discussed above, and it is an object of the invention to provide a thin-film magnetic head that is capable of stabilizing and enhancing the intensity of a leakage magnetic field from a neighborhood of a gap even in narrower tracks, and exhibits outstanding characteristics, including overwrite characteristic, and a manufacturing method for the same.

A first aspect of the present invention provides a thin-film magnetic head including: a first lower core layer; a second lower core layer deposited on the first lower core layer for a predetermined length from the front edge surface of the thin-film magnetic head in a height direction; an insulating layer deposited on a region of the second lower core layer, the region being at the rear in the height direction; a magnetic pole laminate deposited on the second lower core layer or on the second lower core layer and the insulating layer for a predetermined length from the front edge surface at the rear in the height direction, the magnetic pole laminate being formed of a lower magnetic pole layer, a gap layer, and an upper magnetic pole layer deposited in this order from bottom to top or formed of the gap layer and the upper magnetic pole layer in this order from bottom to top; and an upper core layer deposited on the upper magnetic pole layer.

In the first aspect of the present invention, the magnetic pole laminate has, for example, a three-layer structure that includes a lower magnetic pole layer, a gap layer, and an upper magnetic pole layer. The magnetic pole laminate, however, is not provided with the Gd defining layer, which is provided in the conventional example shown in FIG. 16.

Hence, according to the invention, the magnetic pole laminate can be easily and properly formed into a substantially rectangular shape. This solves the problems with the prior art, including the problem of the curved gap layer caused by the presence of the Gd defining layer or the problem of the magnetic saturation due to a reduced volume of the upper magnetic pole layer.

Unlike the conventional example shown in FIG. 16, the second lower core layer is provided under the magnetic pole laminate, making it possible to successfully avoid the magnetic saturation at the lower magnetic pole layer.

Also unlike the conventional example shown in FIG. 18, the structure of the magnetic pole laminate does not require depth trimming, providing an advantage in that a stable track width can be easily obtained.

Thus, the first aspect of the present invention allows the intensity of a recording magnetic field in the vicinity of a gap to be stabilized and enhanced, making it possible to fabricate a thin-film magnetic head or inductive head capable of successfully supporting narrower tracks.

Preferably, the rear edge surface of the magnetic pole laminate is formed by a vertical surface extending in a direction perpendicular to the surface of the second lower core layer.

Preferably, the rear edge surface of the magnetic pole laminate is positioned closer to the front edge surface than the rear edge surface of the second lower core layer is.

A second aspect of the present invention provides a thin-film magnetic head including: a first lower core layer; a second lower core layer deposited on the first lower core layer over a predetermined length in a height direction from the front edge surface of the thin-film magnetic head; an insulating layer deposited on a region of the second lower core layer, the region being at the rear in the height direction; a gap layer deposited on the second lower core layer; a second upper core layer deposited on the gap layer over a predetermined length toward the rear in the height direction from the front edge surface; and a first upper core layer deposited on the second upper core layer, wherein the rear edge surface of the second upper core layer is positioned closer to the front edge surface than the rear edge surface of the second lower core layer is.

According to the second aspect of the invention, the rear edge surface of the second upper core layer is positioned closer to the front edge surface of the thin-film magnetic head than the rear edge surface of the second lower core layer is. Hence, when the second upper core layer and the second lower core layer are subjected to depth trimming and side trimming, as in the case of the conventional example shown in FIG. 18, for instance, the chance of the problem with the prior art will be minimized, the problem being the adhesion of the adherent film formed of an insulating material to both side edge surfaces of the second upper core layer in the track width direction. As a result, the track width can be easily set to a predetermined dimension, making it possible to fabricate a thin-film magnetic head or inductive head that exhibits a stable, high intensity of the recording magnetic field from the vicinity of a gap.

Preferably, the rear edge surface of the second upper core layer is formed of a vertical surface that extends in the direction perpendicular to the surface of the second lower core layer.

Preferably, the magnetic pole laminate or the second upper core layer is constituted by a distal end portion formed to have a predetermined width in the track width direction and extended from the front edge surface in the height direction, and a rear end portion whose width increases in the track width direction from the proximal end of the distal end portion in the height direction.

The gap layer is preferably formed of a nonmagnetic conductive material, and the gap layer is preferably formed of one or two or more of NiP, NiPd, NiW, NiMo, Au, Pt, Rh, Pd, Ru, and Cr.

Preferably, the insulating layer is provided with a coil accommodating groove, a coil layer is provided in the coil accommodating groove, and the surface of the coil layer is formed to be flush with the surface of the magnetic pole laminate or the second upper core layer.

A third aspect of the present invention provides a manufacturing method for a thin-film magnetic head that includes the steps of:

(a) depositing by plating a second lower core layer on a first lower core layer, the second lower core layer being formed for a predetermined length in a height direction from a front edge surface of the thin-film magnetic head;

(b) depositing an insulating layer on the first lower core layer in the height direction from the rear edge surface of the second lower core layer;

(c) depositing a magnetic pole laminate on the second lower core layer in the height direction from the front edge surface by successively plating a lower magnetic pole layer, a gap layer, and an upper magnetic pole layer in this order from bottom to top, or a gap layer and an upper magnetic pole layer in this order from bottom to top, the rear edge surface of the magnetic pole laminate being positioned closer to the front edge surface than the rear edge surface of the second lower core layer is;

(d) depositing a coil layer on the insulating layer positioned at the rear in the height direction from the magnetic pole laminate, and covering the coil layer with a second insulating layer; and (e) depositing an upper core layer at the rear in the height direction from above the upper magnetic pole layer.

By carrying out steps (a) through (e) described above, it is possible to easily and properly fabricate a thin-film magnetic head that has a second lower core layer, the rear edge surface of a magnetic pole laminate thereof being positioned closer to the front edge surface of the thin-film magnetic head than the rear edge surface of the second lower core layer is.

The thin-film magnetic head fabricated by the process including the above steps will exhibit a stable, high intensity of the recording magnetic field in the vicinity of a gap, and will also successfully accommodate narrower tracks.

Preferably, in step (c) above, the rear edge surface of the magnetic pole laminate is formed to be perpendicular to the surface of the second lower core layer.

Preferably, step (d) above is replaced by the following steps of:

(f) forming a coil accommodating groove in the insulating layer positioned farther toward the rear in the height direction than the magnetic pole laminate;

(g) forming a coil layer in the coil accommodating groove, and covering the coil layer with a coil insulating layer; and (h) trimming the surfaces of the magnetic pole laminate, the coil layer, and the coil insulating layer until the surface of the magnetic pole laminate and the surface of the coil layer become flat and flush.

Preferably, the gap layer is formed of a nonmagnetic conductive material. To be more specific, the gap layer is formed of a nonmagnetic conductive material composed of one or two or more of NiP, NiPd, NiW, NiMo, Au, Pt, Rh, Pd, Ru, and Cr.

Thus, the lower magnetic pole layer, the gap layer, and the upper magnetic pole layer can be successfully formed by plating.

DESCRIPTION OF THE PREFERRED EMBODIMENTS

Figure 1:
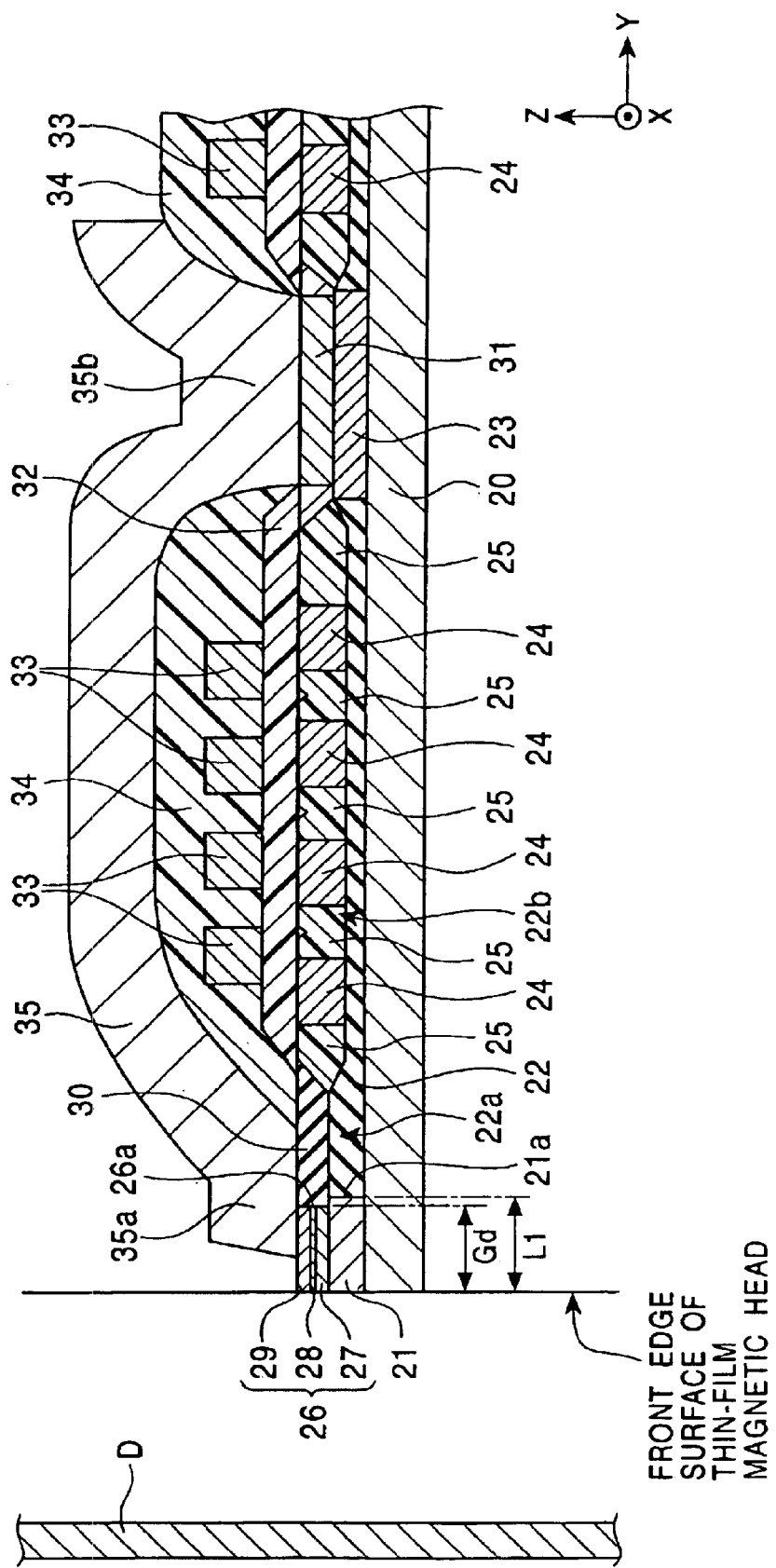
FIG. 1 is a partial longitudinal sectional view showing a structure of a thin-film magnetic head according to a first embodiment of the present invention.

FIG. 1 is a partial longitudinal sectional view in a height direction showing a structure of a thin-film magnetic head in accordance with the present invention.

The thin-film magnetic head shown in FIG. 1 is an inductive head for recording. According to the present invention, an MR head for reproduction that utilizes the magneto-resistance effect may be provided under the inductive head.

Referring to FIG. 1, a first lower core layer 20 is formed of a magnetic material, such as Permalloy. If a head for reproduction is provided under the first lower core layer 20, then a shielding layer separate from the first lower core layer 20 may be provided to protect a magneto-resistive device, such as a giant magneto-resistive device (GMR device), an anisotropic magneto-resistive device (AMR device), or a tunnel magneto-resistive device (TMR device), from noises. Alternatively, the first lower core layer 20 may function as an upper shielding layer of the reproducing head rather than providing the shielding layer.

As shown in FIG. 1, a second lower core layer 21 formed of a magnetic material, such as a NiFe-based alloy, is deposited on the first lower core layer 20 from the front edge surface of the thin-film magnetic head in a height direction (direction Y in the drawing). The term "the front edge surface of the thin-film magnetic head" refers to the surface opposing a recording medium D, as shown in FIG. 1. The second lower core layer 21 is formed for a predetermined length L1 in the height direction.

A first back gap layer 23 made of a magnetic material is also deposited on the first lower core layer 20 at a distance in the height direction (direction Y in the drawing). The first back gap layer 23 is preferably made of the same magnetic material as that of the second lower core layer 21 and formed in the same step so as to simplify the manufacturing process; however, it may be made of a different material or formed in a different step.

Referring to FIG. 1, an insulating material layer 22 composed of an insulating material, such as $Al_2O_3$ or $SiO_2$, is formed at the rear in the height direction (direction Y in the drawing) from a rear edge surface 21a of the second lower core layer 21. The surface of a front end portion 22a of the insulating material layer 22 is formed to be flush with the surface of the second lower core layer 21. On the surface of the insulating material layer 22, a coil accommodating groove 22b is formed at a distance away from the second lower core layer 21 in the height direction (direction Y in the drawing). The portions of the insulating material layer 22 where the coil accommodating groove 22b has been formed are thinner than the front end portion 22a of the insulating material layer 22.

First coil layers 24 are formed in the coil accommodating groove 22b. The first coil layers 24 are composed of a nonmagnetic conductive material, such as Cu.

Coil insulating layers 25 made of an organic insulating material, such as a resist, or an inorganic insulating material, such as $Al_2O_3$ or $SiO_2$, is provided between the conductive portions of the first coil layers 24.

On the second lower core layer 21, a magnetic pole laminate 26 is formed such that it extends in the height direction (direction Y in the drawing) from the front edge surface of the thin-film magnetic head. The magnetic pole laminate 26 is formed of a lower magnetic pole layer 27, a gap layer 28, and an upper magnetic pole layer 29 in this order from bottom to top.

Figure 4:
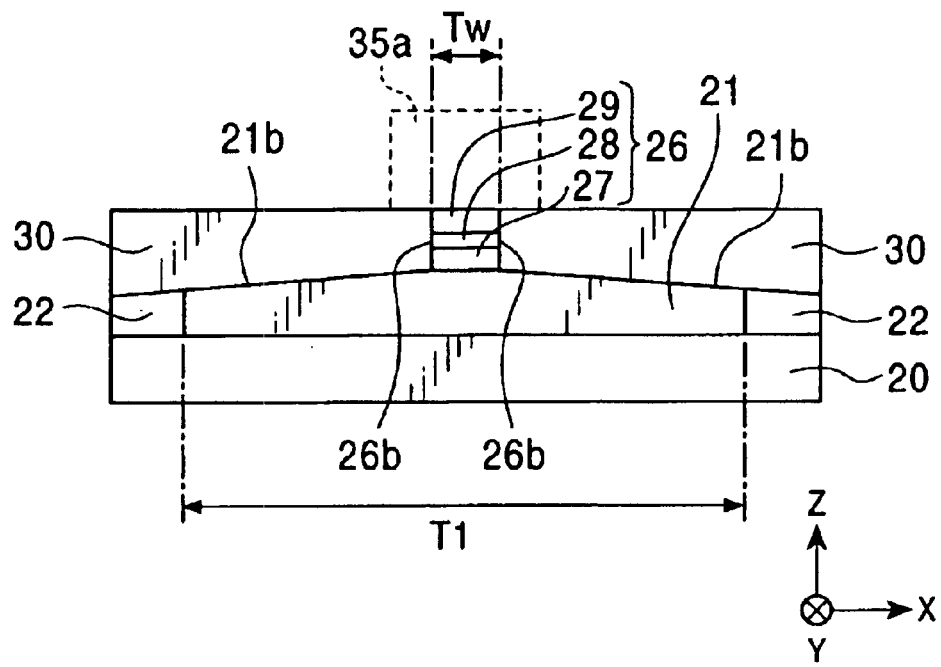
FIG. 4 is a partial front view of the thin-film magnetic heads shown in FIGS. 1 and 2.

In the embodiment shown in FIG. 1, a rear edge surface 26a of the magnetic pole laminate 26 is positioned closer to the front edge surface of the thin-film magnetic head than the rear edge surface 21a of the second lower core layer 21 is. As shown in FIG. 4, which is a partial front view of the thin-film magnetic head shown in FIG. 1 observed from the front edge surface side, the width of the magnetic pole laminate 26 in the track width direction (direction X in the drawing) is set to be smaller than a width T1 of the second lower core layer 21 in the track width direction, and the width of an upper magnetic pole layer 29 of the magnetic pole laminate 26 restricts a track width Tw.

In the embodiment shown in FIG. 1, a second back gap layer 31 formed of a magnetic material is deposited on the first back gap layer 23. The sectional area of plane X-Y of the second back gap layer 31 is set to be smaller than the sectional area of plane X-Y of the first back gap layer 23. Alternatively, however, the sectional area of plane X-Y of the second back gap layer 31 may be set to be larger than the sectional area of plane X-Y of the first back gap layer 23.

An insulating layer 30 made of $Al_2O_3$ or $SiO_2$ or the like is formed such that it extends from the rear edge surface 26a of the magnetic pole laminate 26 toward the rear in the height direction (direction Y in the drawing). The surface of the insulating layer 30 is formed to be flush with the surface of the magnetic pole laminate 26. Furthermore, in the embodiment shown in FIG. 1, the surfaces of the first coil layers 24 and the coil insulating layers 25 are also flush with the surface of the magnetic pole laminate 26.

An organic insulating layer 32 made of an organic insulating material, such as a resist, is deposited on the coil insulating layers 25 and the first coil layers 24, and second coil layers 33 are deposited on the organic insulating layer 32. The gaps between the conductive portions of the second coil layer 33 are filled with an organic insulating layer 34 made of a resist or the like, and the second coil layers 33 are covered with the organic insulating layer 34.

An upper core layer 35 made of a magnetic material is deposited by, for example, flame plating such that it partly covers the upper magnetic pole layer 29 constituting the magnetic pole laminate 26 and entirely covers the organic insulating layer 34, as shown in FIG. 1. A distal end portion 35a of the upper core layer 35 is magnetically connected onto the upper magnetic pole layer 29. In this embodiment, the distal end portion 35a is formed toward the rear in the height direction (direction Y in the drawing) away from the front edge surface of the thin-film magnetic head. Alternatively, however, the distal end portion 35a may be formed to be flush with the front edge surface.

A proximal end portion 35b of the upper core layer 35 is magnetically connected onto the second back gap layer 31. In the embodiment shown in FIG. 1, a magnetic path is formed that passes the upper magnetic pole layer 29, the upper core layer 35, the second back gap layer 31, the first back gap layer 23, the first lower core layer 20, the second lower core layer 21, and the lower magnetic pole layer 27.

Although not shown, the front edge surface of the thin-film magnetic head is provided with a protective layer formed of a diamond-like carbon (DLC) or the like.

The structural characteristics of the thin-film magnetic head according to the present invention shown in FIG. 1 will now be explained. In the thin-film magnetic head shown in FIG. 1, the magnetic pole laminate 26 is formed of three layers, namely, the lower magnetic pole layer 27, the gap layer 28, and the upper magnetic pole layer 29, which are stacked in this order from bottom to top.

Figure 16:
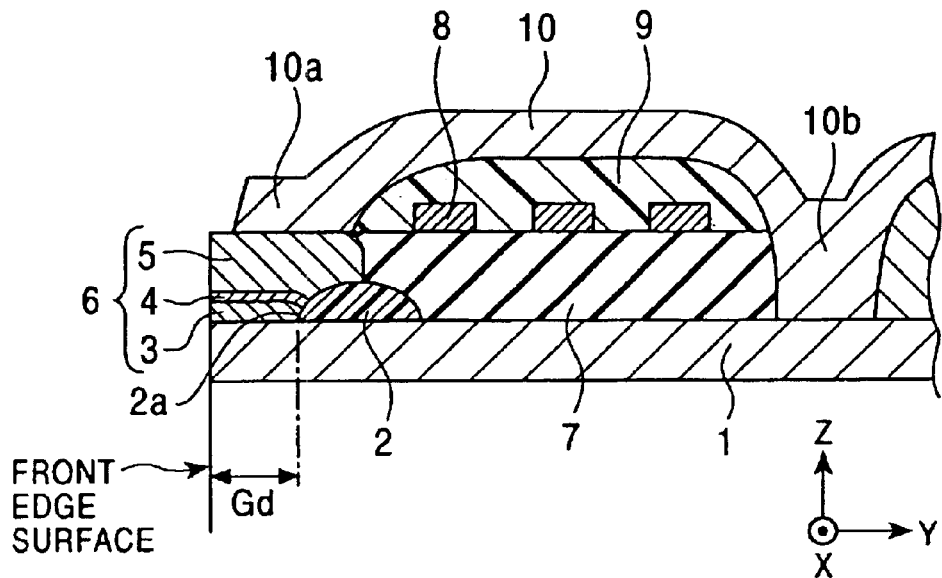
FIG. 16 is a partial longitudinal sectional view showing a structure of a conventional thin-film magnetic head.

Unlike the conventional example shown in FIG. 16, the Gd defining layer 2 is not provided under the magnetic pole laminate 26 in this embodiment. Therefore, plating growth can be properly accomplished on the entire top surface of the second lower core layer 21, which provides a plating base layer for the layers making up the magnetic pole laminate 26. The plating base layer may alternatively be provided separately. Thus, the layers can be properly formed into substantially rectangular or flat plane shapes. In other words, unlike the case of the prior art, the portions of the lower magnetic pole layer 27 and the upper magnetic pole layer 29, which constitute the magnetic pole laminate 26, that are adjacent to the rear edge surface 26a are not thinner. Hence, the magnetic pole layers 27 and 29 can be formed to have a predetermined volume, minimizing the chance of the magnetic pole layers 27 and 29 reaching magnetic saturation.

Moreover, since the Gd defining layer 2 is not formed under the magnetic pole laminate 26, the magnetic pole layers 27 and 29, and the gap layer 28 can be formed to have flat surfaces parallel to the surface of the lower core layer 20 (parallel to the plane X-Y in the drawing). This solve the problem with the prior art in which the rear end side of the gap layer 28 is curvedly formed. The gap layer 28 can be properly formed to have a substantially flat plate shape.

Further according to the present invention, the upper magnetic pole layer 29 is formed to have a substantially rectangular shape, and the top surface of the upper magnetic pole layer 29 is properly formed to be flat. This arrangement allows the area of contact between the upper core layer 35 and the upper magnetic pole layer 29 to be effectively increased.

Thus, the embodiment shown in FIG. 1 does not have the Gd defining layer under the magnetic pole laminate 26 so as to allow the magnetic pole laminate 26 to be formed into a substantially rectangular shape providing a predetermined volume. This makes it possible to minimize the chance of magnetic saturation and to prevent the surface of the gap layer 28 from curving. Even with narrower tracks, therefore, the intensity of the recording magnetic field in the vicinity of a gap can be stabilized and increased, making it possible to fabricate a thin-film magnetic head featuring excellent recording characteristics typically represented by an overwrite characteristic.

Furthermore, as shown in FIG. 1, in the embodiment having no Gd defining layer under the magnetic pole laminate 26, even if the magnetic pole laminate 26 is formed to be thin in order to successfully support narrower tracks, the volume of the magnetic pole laminate 26 will not be extremely smaller than the case where the Gd defining layer is provided.

Figure 17:
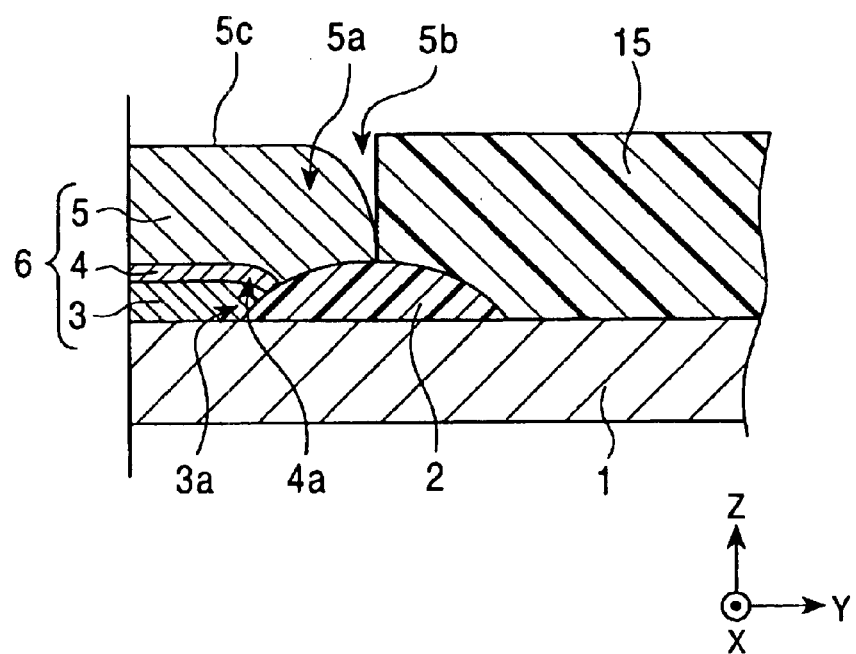
FIG. 17 is a partial enlarged longitudinal sectional view of the thin-film magnetic head shown in FIG. 16.

In the conventional example shown in FIGS. 16 and 17, the presence of the Gd defining layer 2 has posed a problem in that the volume of the upper magnetic pole layer 5 is small, making it easier to reach magnetic saturation. To avoid the problem, the resist layer 15 providing the frame for forming the magnetic pole laminate 6 has been formed to be thick to permit a deeper pattern, thereby maintaining the a predetermined volume of the upper magnetic pole layer 5. When the resist layer 15 is formed thickly, however, patterning accuracy deteriorates when a pattern is made to form the magnetic pole laminate 6 by exposing and developing the resist layer 15, and the track in the pattern tends to be formed to be excessively wide. For this reason, the conventional example shown in FIGS. 16 and 17 does not make it possible to fabricate a thin-film magnetic head that successfully accommodates narrower tracks. According to the present invention, the absence of the Gd defining layer under the magnetic pole laminates 26 permits the magnetic pole laminate 26 to be properly grown by plating into a predetermined configuration. Hence, even when the magnetic pole laminate 26 is formed to be thinner as a whole than the conventional example, it is easy to maintain a predetermined volume of the upper magnetic pole layer 29 constituting the magnetic pole laminate 26.

Thus, according to the present invention, the resist layer for forming the magnetic pole laminate 26 can be formed to be thinner. With this arrangement, the patterning accuracy for exposure and development can be successfully improved, thus preventing the pattern from spreading widthwise. This makes it possible to fabricate a thin-film magnetic head capable of successfully achieving narrower tracks.

Preferably, the thickness of the magnetic pole laminate 26 ranges from 1.5 $\mu$m to 3.0 $\mu$m.

According to the invention, a second lower core layer 21 is provided under the magnetic pole laminate 26. The presence of the second lower core layer 21 properly restrains the magnetic saturation of the lower magnetic pole layer 27.

As described above, according to the present invention, the Gd defining layer in the prior art is not provided, making it easy to maintain a predetermined volume of the upper magnetic pole layer 29 even when the entire thickness of the magnetic pole laminate 26 is decreased. If, however, the volume of the lower magnetic pole layer 27 making up the magnetic pole laminate 26 is extremely small, then the lower magnetic pole layer 27 easily reaches magnetic saturation, which is undesirable.

To avoid the inconvenience, the second lower core layer 21 is provided under the magnetic pole laminate 26. The second lower core layer 21 is partially deposited on the first lower core layer 20, and the lower magnetic pole layer 27 is deposited on the first lower core layer 20 so as to alleviate the magnetic saturation of the lower magnetic pole layer 27 by the presence of the second lower core layer 21.

As shown in FIG. 4, the width T1 of the second lower core layer 21 in the track width direction (direction X in the drawing) is larger than the width of the lower magnetic pole layer 27 in the track width direction (direction X in the drawing), but smaller than the width of the first lower core layer 20 in the track width direction.

The length L1 of the second lower core layer 21 in the height direction (direction Y in the drawing) is larger than the length of the lower magnetic pole layer 27 in the height direction, but smaller than the length of the first lower core layer 20 in the height direction, as shown in FIG. 1.

Preferably, the thickness of the second lower core layer 21 ranges from 0.5 $\mu$m to 1.5 $\mu$m.

Thus, the structure of the thin-film magnetic head shown in FIG. 1 is characterized in that the magnetic pole laminate 26 has three layers, namely, the lower magnetic pole layer 27, the gap player 28, and the upper magnetic pole layer 29, and the second lower core layer 21 is provided under the magnetic pole laminate 26. With this arrangement, the magnetic pole laminate 26 can be formed in a predetermined configuration, the magnetic saturation in the magnetic pole layers can be restrained, and the intensity of the recording magnetic field leaking from the vicinity of a gap can be stably increased, thus allowing the recording characteristics, including overwrite characteristic, to be properly improved. Thus, a thin-film magnetic head capable of successfully supporting narrower tracks can be manufactured.

Other characteristics of the structure of the thin-film magnetic head shown in FIG. 1 will now be explained. Preferably, the rear edge surface 26a of the magnetic pole laminate 26 is formed as a vertical surface perpendicular to (in direction Z in the drawing) the top surface of the second lower core layer 21. This allows the upper magnetic pole layer 29 to be formed into a substantially rectangular shape and the top surface of the upper magnetic pole layer 29 to be flat, making it possible to increase the area of contact between the upper magnetic pole layer 29 and the upper core layer 35. In the present invention, the rear edge surface 26a of the magnetic pole laminate 26 can be formed to be a surface perpendicular to the top surface of the second lower core layer 21 because no Gd defining layer is provided under the magnetic pole laminate 26. If the Gd defining layer were provided, then the magnetic pole portion formed on the Gd defining layer would be extremely thin, causing the top surface of the magnetic pole portion to be curved (refer to FIG. 17). According to the present invention, the absence of the Gd defining layer allows the magnetic pole laminate 26 to be properly grown by plating. Hence, there should be no problems as observed with the prior art. The rear edge surface 26a of the magnetic pole laminate 26 can be formed to be a surface perpendicular to (direction Z in the drawing) the top surface of the second lower core layer 21.

In the embodiment shown in FIG. 1, the magnetic pole laminate 26 is constructed of three layers, namely, the lower magnetic pole layer 27, the gap layer 28, and the upper magnetic pole layer 29. The magnetic pole laminate 26 may alternatively, however, be constructed of two layers, namely, the gap layer 28 and the upper magnetic pole layer 29. In such a case, preferably, the second lower core layer 21 spreading on both sides in the track width direction of the gap layer 28 is depth-trimmed to form a projection on the second lower core layer 21 that juts out toward the gap layer 28 thereby to properly restrain the occurrence of side fringing. This permits the manufacture of thin-film magnetic heads capable of successfully supporting narrower tracks.

The layers making up the magnetic pole laminate 26 is successively deposited by plating. The lower magnetic pole layer 27 is formed by plating on the second lower core layer 21, so that the top surface of the second lower core layer 21 provides a plating base layer for growing the lower magnetic pole layer 27 by plating. Alternatively, however, a separate plating base layer may be provided. For instance, a thin plating base layer formed of a NiFe alloy or the like may be formed on the second lower core layer 21 by sputtering or the like, then the lower magnetic pole layer 27 is grown by plating thereon.

According to the invention, the gap layer 28 is preferably formed of a nonmagnetic conductive material, since the gap layer 28 is also formed by plating. Preferably, the gap layer 28 is formed of a nonmagnetic conductive material of one or two or more of NiP, NiPd, NiW, NiMo, Au, Pt, Rh, Pd, Ru, and Cr.

As a specific embodiment in accordance with the present invention, NiP is used for the gap layer 28. Using NiP to make the gap layer 28 allows the gap layer 28 to be properly nonmagnetic.

The upper magnetic pole layer 29 and the lower magnetic pole layer 27 making up the magnetic pole laminate 26 may be formed of a single layer or multiple magnetic layers. In the case of the multi-layer structure, the magnetic layers may be constructed of either the same material or different magnetic materials. Whether different materials are used or the same material is used, if the composition ratio is changed for each magnetic layer, it is desirable to set the composition ratio such that a magnetic layer closer to the gap layer 28 has a higher saturation flux density Bs. This makes it possible to increase the intensity of the recording magnetic field leaking from the vicinity of the gap. The saturation flux density Bs is preferably higher in the second lower core layer 21 than in the first lower core layer 20 or the same, and higher in the lower magnetic pole layer 27 than in the second lower core layer 21. The saturation flux density Bs is preferably higher in the upper magnetic pole layer 29 than in the upper core layer 35. This allows magnetic fluxes to be properly concentrated in the vicinity of the gap, making it easier to achieve a higher recording density.

In the embodiment shown in FIG. 1, the rear edge surface 26a of the magnetic pole laminate 26 is formed at a position more closely to the front edge surface of the thin-film magnetic head (in the opposite direction from direction Y in the drawing) than the rear edge surface 21a of the second lower core layer 21 is.

As shown in FIG. 1, the following advantages can be expected by locating the rear edge surface 26a of the magnetic pole laminate 26 closer to the front edge surface than the rear edge surface 21a of the second lower core layer 21 is.

In the step of side-trimming the both edge surfaces 26b of the magnetic pole laminate 26, the adhesion of an insulating film to the both side edge surfaces 26b and 26b of the magnetic pole laminate 26 shown in FIG. 4 can be restrained, and the portion of the upper magnetic pole layer 29, which constitutes the magnetic pole laminate 26, in the track width direction can be formed into a predetermined shape.

Figure 6:
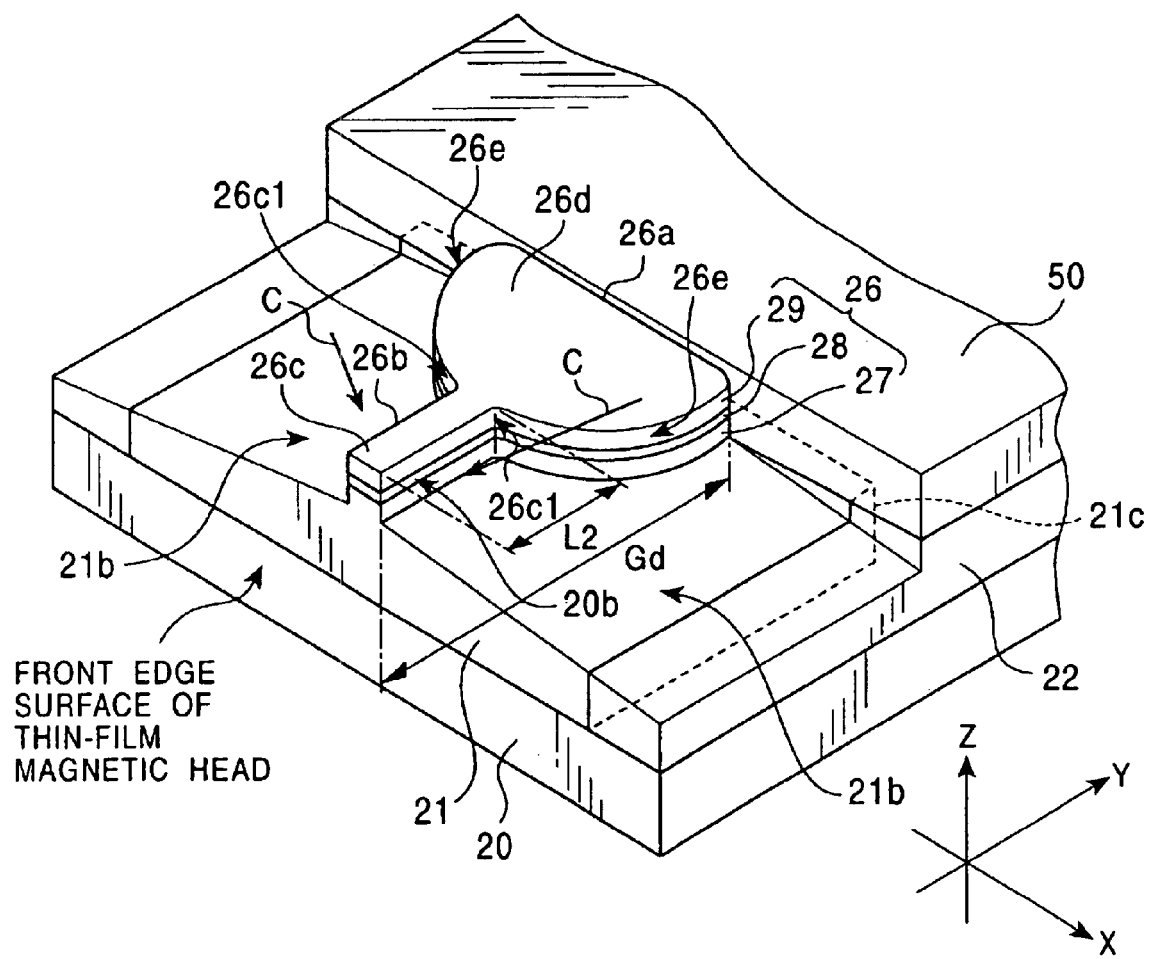
FIG. 6 is a partial perspective view of the thin-film magnetic head shown in FIG. 1.

FIG. 6 is a partial perspective view showing only the first lower core layer 20, the second lower core layer 21, and the magnetic pole laminate 26. After depositing the magnetic pole laminate 26, both side edge surfaces 26b and 26b of the magnetic pole laminate 26 are subjected to ion milling (side trimming) in direction C aslant with respect to direction Z in the drawing to further reduce the width of the magnetic pole laminate 26 in the track width direction (direction X in the drawing) thereby to make a thin-film magnetic head successfully compatible with narrower tracks.

According to the invention, since the rear edge surface 26a of the magnetic pole laminate 26 is positioned closer to the front edge surface of the thin-film magnetic head (in the opposite direction from direction Y in the drawing) than the rear edge surface 21a of the second lower core layer 21 is, the insulating material layer 22 located farther in the height direction (direction Y in the drawing) than the rear edge surface 21a of the second lower core layer 21 remains covered by a mask layer 50, such as a resist layer, when the side trimming mentioned above is carried out. This makes it possible to properly prevent the insulating material layer 22 from being trimmed by ion milling in the side trimming step. Thus, the present invention solves the problem in that the adherent film composed of insulating elements that come flying from the insulating material layer 22 being trimmed adheres to both side edge surfaces 26b of the magnetic pole laminate 26 when the side trimming is carried out.

Thus, according to the invention, the problem with the prior art (refer to FIG. 19) in that the track width of the magnetic pole laminate 26 becomes inconsistent due to the adherent film of insulating elements sticking to the both side edge surfaces 26b of the magnetic pole laminate 26 will not arise, making it possible to form the magnetic pole laminate 26 in a predetermined configuration with a predetermined track width Tw. Preferably, both side edge surfaces 26b of the magnetic pole laminate 26 are formed to extend in the vertical direction (direction Z in the drawing) from the top surface of the second lower core layer 21, as shown in FIG. 4. Alternatively, however, the side edge surfaces 26b may be formed such that their widths in the track width direction slightly increase in direction Z, as long as both side edge surfaces of the magnetic pole laminate are not wavy, while they are wavy in the conventional example shown in FIG. 19. Preferably, the track width Tw ranges from 0.1 $\mu$m to 0.5 $\mu$m.

Referring to FIG. 4 and FIG. 6, both symmetrical surfaces 21b of the second lower core layer 21 that extend in the track width direction (direction X in the drawing) from the proximal end of the lower magnetic pole layer 27 are formed of slant surfaces or curved surfaces in which the thickness of the second lower core layer 21 gradually decreases as the distance in the track width direction from the lower magnetic pole layer 27 increases. The slant surfaces or the curved surfaces are formed by side trimming in direction C shown in FIG. 6.

As described above, the invention allows the magnetic pole laminate 26 to be formed with the predetermined track width, thus restraining the quality problem in that the intensity of a leakage magnetic field from the vicinity of a gap varies from one product to another. Hence, it is possible to fabricate, with a higher yield, thin-film magnetic heads with a stable intensity of the recording magnetic field from the vicinity of the gaps.

With the rear edge surface 26a of the magnetic pole laminate 26 positioned closer to the front edge surface than the rear edge surface 21a of the second lower core layer 21 is, as shown in FIG. 1, the rear edge surfaces of the first lower core layer 20, the second lower core layer 21, and the lower magnetic pole layer 27 approach the front edge surface in this order. This arrangement makes it possible to properly narrow down the recording magnetic field, which is led from the first lower core layer 20 to the lower magnetic pole layer 27, from the first lower core layer 20 to the lower magnetic pole layer 27. Thus, the intensity of the recording magnetic field leaking from the vicinity of the gap can be properly increased.

With the rear edge surface 26a of the magnetic pole laminate 26 positioned closer to the front edge surface than the rear edge surface 21a of the second lower core layer 21 is, the gap depth (Gd) is defined by the length from the front edge surface of the magnetic pole laminate 26 to the rear edge surface 26a. If the rear edge surface 26a of the magnetic pole laminate 26 is positioned farther toward the front edge surface than the rear edge surface 21a of the second lower core layer 21 is, then the area of the contact between the upper magnetic pole layer 29 and the upper core layer 35 may be considered to decrease, as compared with the case where the rear edge surface 26a is positioned farther in the height direction than the rear edge surface 21a of the second lower core layer 21. As described above, however, according to the invention, the rear edge surface 26a of the magnetic pole laminate 26 can be formed of a vertical surface that vertically extends from the top surface of the second lower core layer 21, and the top surface of the upper magnetic pole layer 29 can be formed of a proper flat surface. Moreover, the magnetic pole laminate 26 can be formed to have a configuration to be explained below, so that the area of the contact between the upper magnetic pole layer 29 and the upper core layer 35 will not be decreased, allowing a recording magnetic field to be properly led from the upper core layer 35 to the upper magnetic pole layer 29. The intensity of the recording magnetic field leaking from the vicinity of the gap can be therefore increased.

The planar shape of the magnetic pole laminate 26 will now be explained with reference to FIG. 6. As shown in FIG. 6, the magnetic pole laminate 26 is constructed of a distal end portion 26c formed to have a predetermined width in the track width direction (direction X in the drawing) and extended from the front edge surface of the thin-film magnetic head in the height direction (direction Y in the drawing), and a rear end portion 26d whose width increases in the track width direction (direction X in the drawing) from proximal ends 26c1 of the distal end portion 26c in the height direction (direction Y in the drawing). The width of the distal end portion 26c does not have to be the same over the full width. The width may, for example, slightly increase as the distance from the front edge surface increases in the height direction.

In the embodiment shown in FIG. 6, the gap depth (Gd) is defined by the distance in the height direction (direction Y in the drawing) from "the front edge surface of the thin-film magnetic head" of the magnetic pole laminate 26 to the rear edge surface 26a. In this embodiment, the distal end portion 26c, which provides the straight portion of the magnetic pole laminate 26, is formed in the gap depth.

For instance, if the Gd defining layer 2 is formed under the magnetic pole laminate 6 as in the case of the conventional example shown in FIG. 16, then the gap depth (Gd) is determined by the distance from the front edge surface 2a of the Gd defining layer 2 to the front edge surface of the thin-film magnetic head. If the magnetic pole laminate 6 has the distal end portion, which provides a straight portion as shown in FIG. 6, then the proximal end of the distal end portion is located at the same position in direction Z in the drawing as the position of the front edge surface 2a of the Gd defining layer 2, or located farther at rear in the height direction (direction Y in the drawing) than the front edge surface 2a of the Gd defining layer 2 is. In other words, with the prior art, a relationship represented by the length of the straight portion in the magnetic pole laminate $\geq$ gap depth (Gd) has been established.

In contrast to the prior art, according to the invention, the Gd defining layer is not formed under the magnetic pole laminate 26; the gap depth (Gd) can be defined by the length of the magnetic pole laminate 26 in the height direction (direction Y in the drawing). With this arrangement, the proximal ends 26c1 of the distal end portion 26c that provides the straight portion of the magnetic pole laminate 26 can be positioned closer to the front edge surface of the thin-film magnetic head than the rear end of the gap depth is. Preferably, a length L2 of the distal end portion 26c, which provides the straight portion, in the height direction (direction Y in the drawing) ranges from 0.3 $\mu$m to 1.2 $\mu$m.

As discussed above, with the proximal ends 26c1 of the distal end portion 26c providing the straight portion being positioned closer to the front edge surface of the thin-film magnetic head than the rear edge of the gap depth, it is possible to form a magnetic pole laminate 26 that is resistant to magnetic saturation, and overwrite characteristic and various other characteristics can be easily improved.

The magnetic saturation can be restrained further properly by forming the distal end portion 26c, which provides the straight portion, to be short within the aforesaid dimensional range.

Referring to FIG. 6, a rear end portion 26d of the magnetic pole laminate 26 is shaped such that its width in the track width direction (direction X in the drawing) gradually increases in the height direction (direction Y in the drawing). Both side edge surfaces 26e of the rear end portion 26d in the track width direction (direction X in the drawing) are formed of, for example, curved surfaces or slant surfaces.

Thus, the area of the top surface of the rear end portion 26d can be increased, allowing the area of contact with the upper core layer 35 to be increased accordingly.

Figure 2:
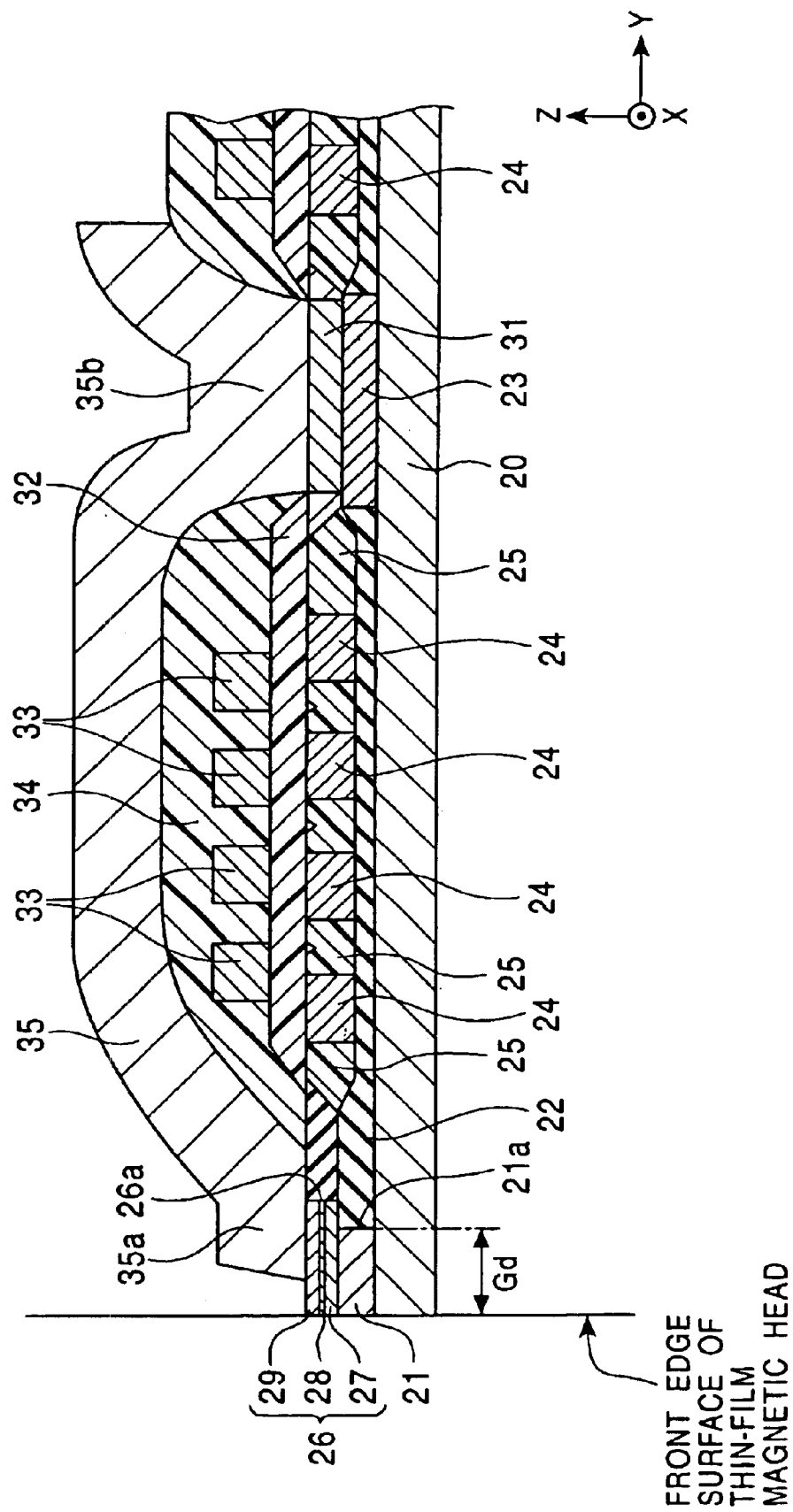
FIG. 2 is a partial longitudinal sectional view showing a structure of a thin-film magnetic head according to a second embodiment of the present invention.

As in the case of the embodiment shown in FIG. 1, if the magnetic pole laminate 26 has the three-layer structure having the lower magnetic pole layer 27, the gap layer 28, and the upper magnetic pole layer 29, and also includes the second lower core layer 21, then the rear edge surface 26a of the magnetic pole laminate 26 may be positioned farther in the height side (direction Y in the drawing) than the rear edge surface 21a of the second lower core layer 21, as illustrated in FIG. 2, which is a partial longitudinal sectional view of the thin-film magnetic head according to a second embodiment of the present invention. In this case, as compared with the case shown in FIG. 1, the chance in which the adherent film of an insulating elements that come flying when a part of the insulating material layer 22 is subjected to side trimming adheres to both side edge surfaces 26b of the magnetic pole laminate 26. However, the adherent film would be extremely thin, hardly leading to inconsistent track widths, as compared with the structure shown in FIG. 3, which will be discussed hereinafter. Hence, it is considered that compatibility with narrower tracks can be properly promoted.

Figure 18:
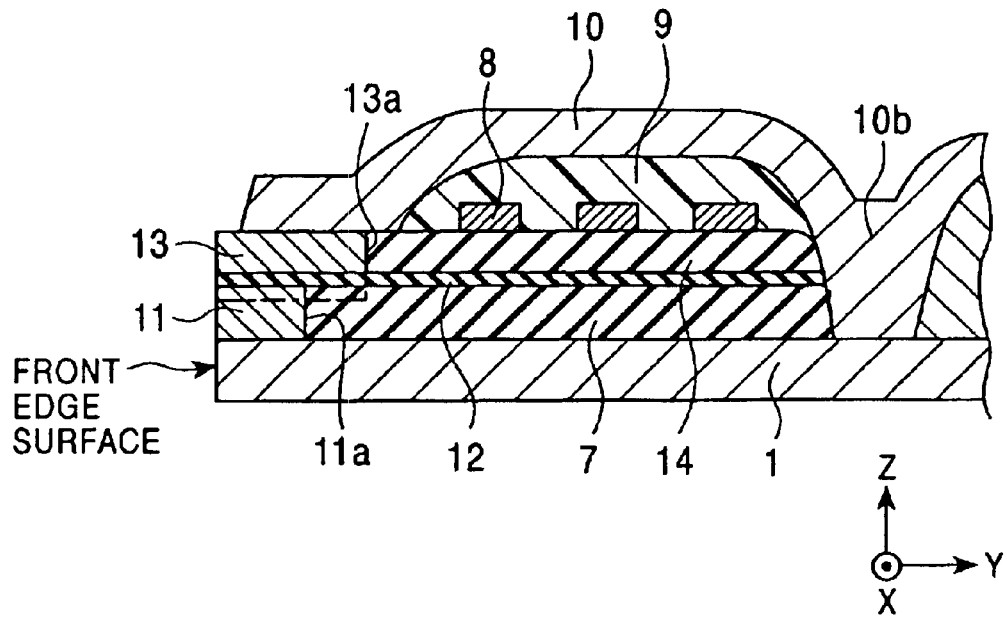
FIG. 18 is a partial longitudinal sectional view of another conventional thin-film magnetic head.
Figure 19:
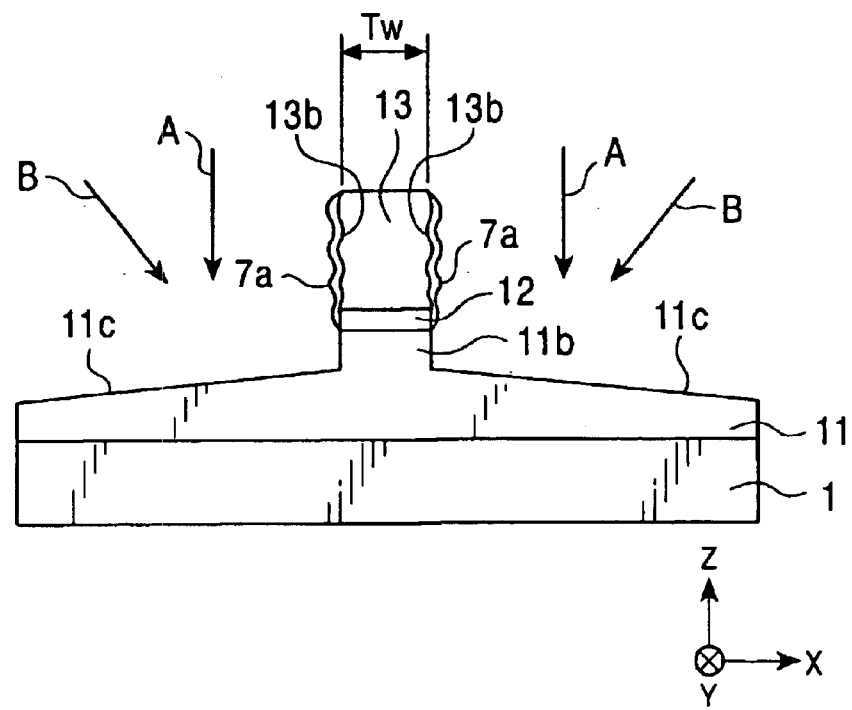
FIG. 19 is a partial front view of the thin-film magnetic head shown in FIG. 18.
Figure 20:
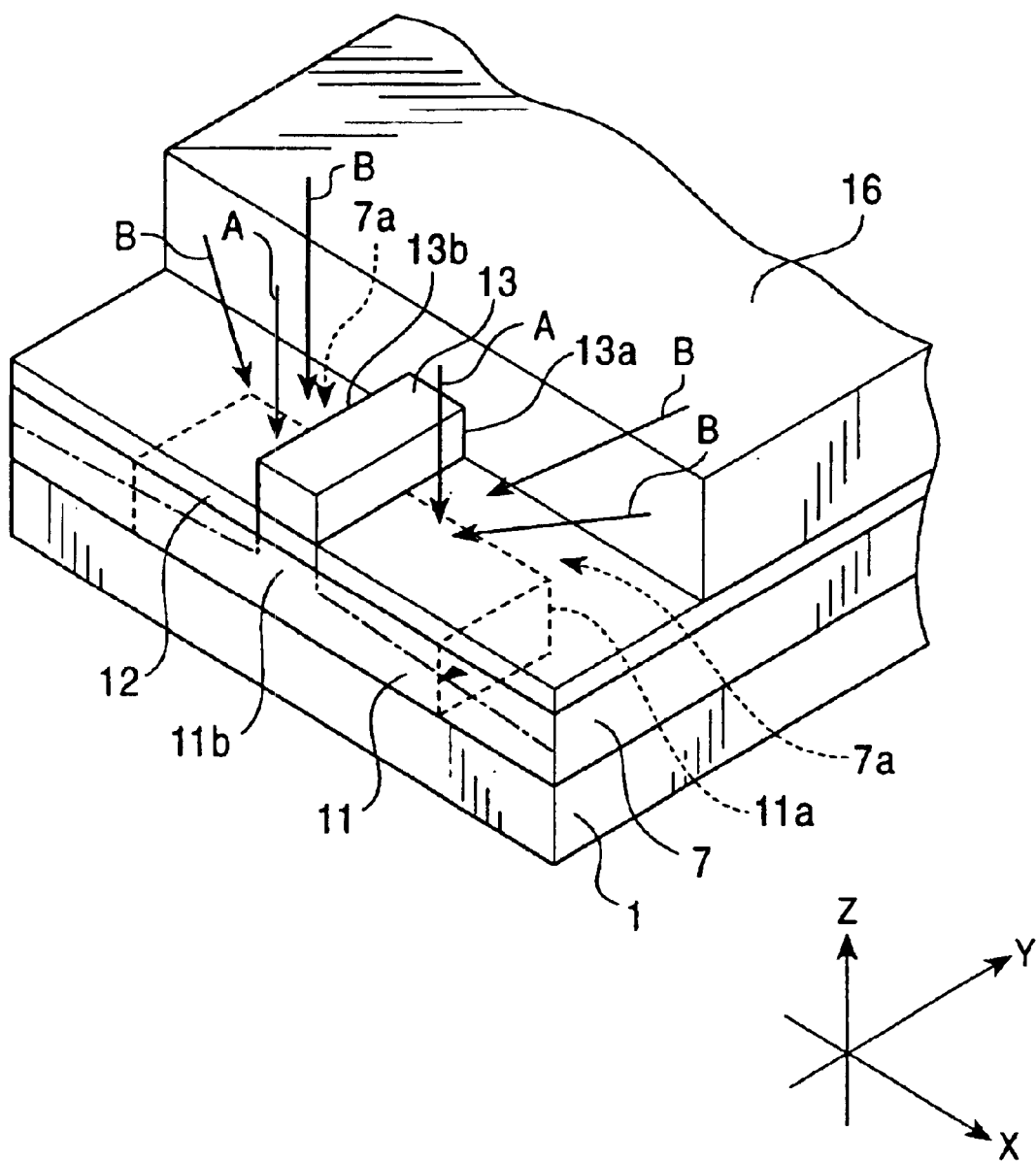
FIG. 20 is a partial perspective view of the thin-film magnetic head shown in FIGS. 18 and 19.

The reason for the above is that forming the magnetic pole laminate 26 by the three layers, the lower magnetic pole layer 27, the gap layer 28, and the upper magnetic pole layer 29, as shown in FIG. 1 or 2, by plating obviates the need for the depth trimming from the directions indicated by arrows A explained in the conventional example in conjunction with FIG. 18 through FIG. 20. The track width configuration can be formed merely by side trimming.

For the side trimming, the milling is carried out from a direction aslant with respect to direction Z in the drawing, as explained in conjunction with FIG. 6. Therefore, as compared with the depth trimming in which the milling is carried out from almost the same direction as direction z in the drawing, the chance of the insulating material layer 22 spreading at the rear of the magnetic pole laminate 26 being trimmed by the side trimming is minimized. This means that the insulating material layer 22 is trimmed less by the side trimming than by the depth trimming.

Accordingly, in the case shown in FIG. 2 in which only side trimming is carried out, even if the rear edge surface 26a of the magnetic pole laminate 26 is positioned farther in the height direction (direction Y in the drawing) than the rear edge surface 21a of the second lower core layer 21, the amount of the insulating elements from the insulating material layer 22 that adheres to both side edge surfaces 26b of the magnetic pole laminate 26 will be small, making it easier to form the track width portion in a predetermined configuration with a predetermined track width Tw.

Naturally, however, it is of course preferable to set the rear edge surface 26a of the magnetic pole laminate 26 closer to the front edge surface of the thin-film magnetic head than the rear edge surface 21a of the second lower core layer 21 is, since the track width portion can be formed more easily into the predetermined configuration with the predetermined track width Tw, allowing a thin-film magnetic head capable of successfully supporting narrower tracks.

If the rear edge surface 26a of the magnetic pole laminate 26 is positioned farther at rear in the height direction (direction Y in the drawing) than the rear edge surface 21a of the second lower core layer 21, as shown in FIG. 2, then the gap depth (Gd) is determined by the distance from "the front edge surface of the thin-film magnetic head" of the second lower core layer 21 to the rear edge surface 21a. In this case also, the proximal ends 26c1 of the distal end portion 26c formed of the straight portion formed in the magnetic pole laminate 26 are preferably positioned closer to the front edge surface than the rear end of the gap depth (Gd) is.

The position where the first coil layer 24 shown in FIG. 1 is formed will now be explained. Referring to FIG. 1, the insulating material layer 22 has the coil accommodating groove 22b, and the first coil layers 24 are accommodated in the coil accommodating groove 22b. It is advantageous to form the coil accommodating groove 22b and to accommodate the first coil layers 24 therein in that the volumes of the conductor portions of the first coil layers 24 can be maximized.

As discussed above, according to the present invention, the absence of the Gd defining layer, which has been provided in the conventional example, makes it possible to reduce the total thickness of the magnetic pole laminate 26, as compared with the conventional example, while maintaining a predetermined volume of the upper magnetic pole layer 29 constituting the magnetic pole laminate 26.

When the magnetic pole laminate 26 is made thinner, however, if the coil accommodating groove 22b is not provided in the insulating material layer 22, then the first coil layers 24, whose top surfaces are formed to be flush with the top surface of the magnetic pole laminate 26, would be thinner accordingly. This would undesirably result in reduced volumes of the conductor portions of the first coil layers 24. To avoid this problem, according to the invention, the insulating material layer 22 is provided with the coil accommodating groove 22b so as to secure adequate volumes of the conductor portions of the first coil layer 24. This arrangement makes it possible to generate a recording magnetic field of a predetermined magnitude.

Alternatively, however, the coil accommodating groove 22b may not be formed, the insulating material layer 22 may be formed to have a uniform thickness, and the first coil layers 24 may be deposited on the insulating material layer 22.

In FIG. 1, the top surfaces of the first coil layers 24 are formed to be flush with the top surface of the magnetic pole laminate 26. Alternatively, however, the top surfaces of the first coil layers 24 may be positioned lower than the top surface of the magnetic pole laminate 26, and the top surface of an insulating layer covering the first coil layers 24 may be formed to be flush with the top surface of the magnetic pole laminate 26.

Figure 3:
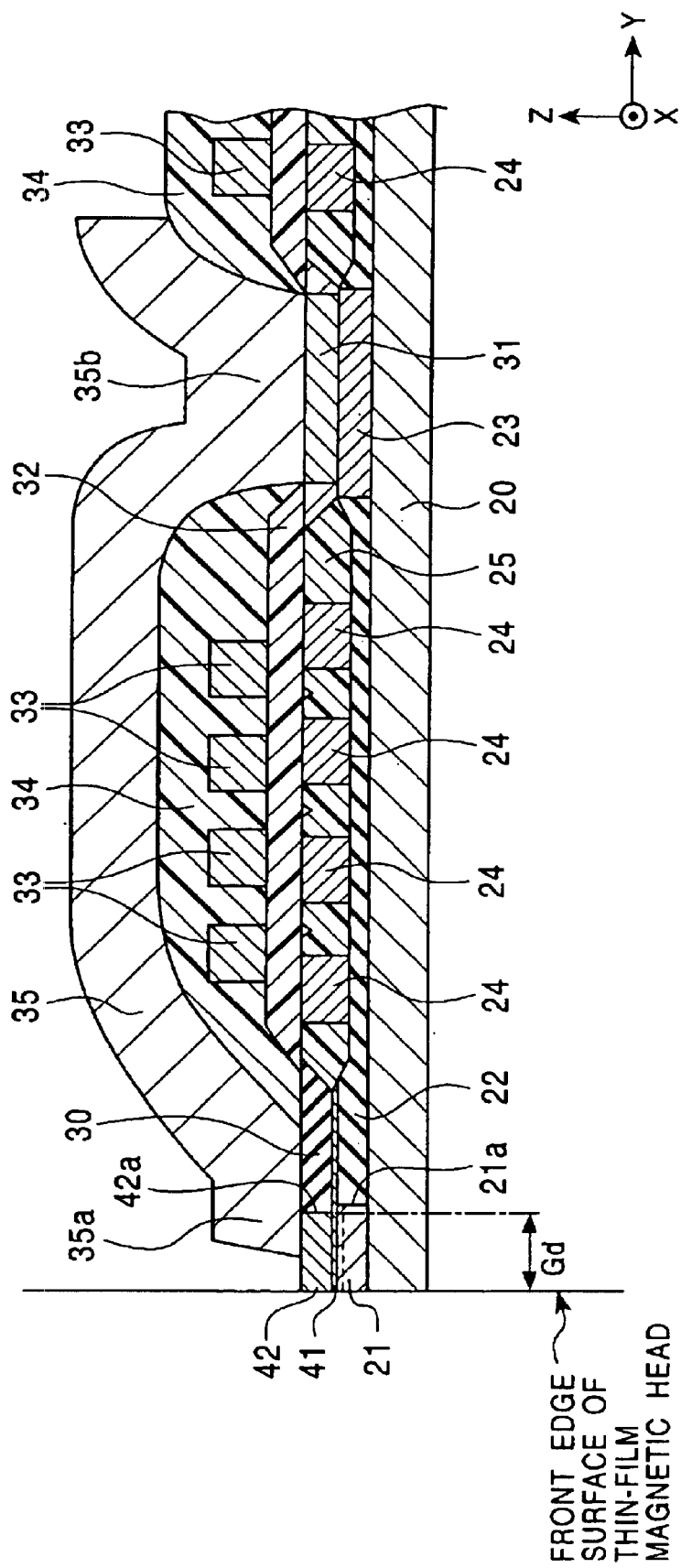
FIG. 3 is a partial longitudinal sectional view showing a structure of a thin-film magnetic head according to a third embodiment of the present invention.

FIG. 3 is a longitudinal sectional view of a thin-film magnetic head according to a third embodiment having a different structure from that of the embodiment shown in FIG. 1.

Unlike the thin-film magnetic head shown in FIG. 1, the thin-film magnetic head shown in FIG. 3 has a long gap layer 41 extended from the top surface of a second lower core layer 21 to a part of the top surface of an insulating material layer 22 at the rear in the height direction (direction Y in the drawing). A second upper core layer 42 is deposited on the gap layer 41. A distal end portion 35a of an upper core layer or the first upper core layer 35 is magnetically connected onto the second upper core layer 42.

The gap layer 41 is formed of an insulating material, e.g., $Al_2O_3$ or $SiO_2$; however, the gap layer 41 may alternatively be formed of a nonmagnetic conductive material as in the case of the gap layer 28 described in conjunction with FIG. 1. If the gap layer 41 is formed using an insulating material, such as $Al_2O_3$, then the gap layer 41 is deposited mostly by sputtering or vapor deposition.

In the thin-film magnetic head shown in FIG. 3, a rear edge surface 42a of a second upper core layer 42 is positioned closer to the front edge surface of the thin-film magnetic head than the rear edge surface 21a of the second lower core layer 21 is. The gap depth (Gd) is determined by the distance from the front edge surface of the second upper core layer 42 to the rear edge surface 42a.

Figure 7:
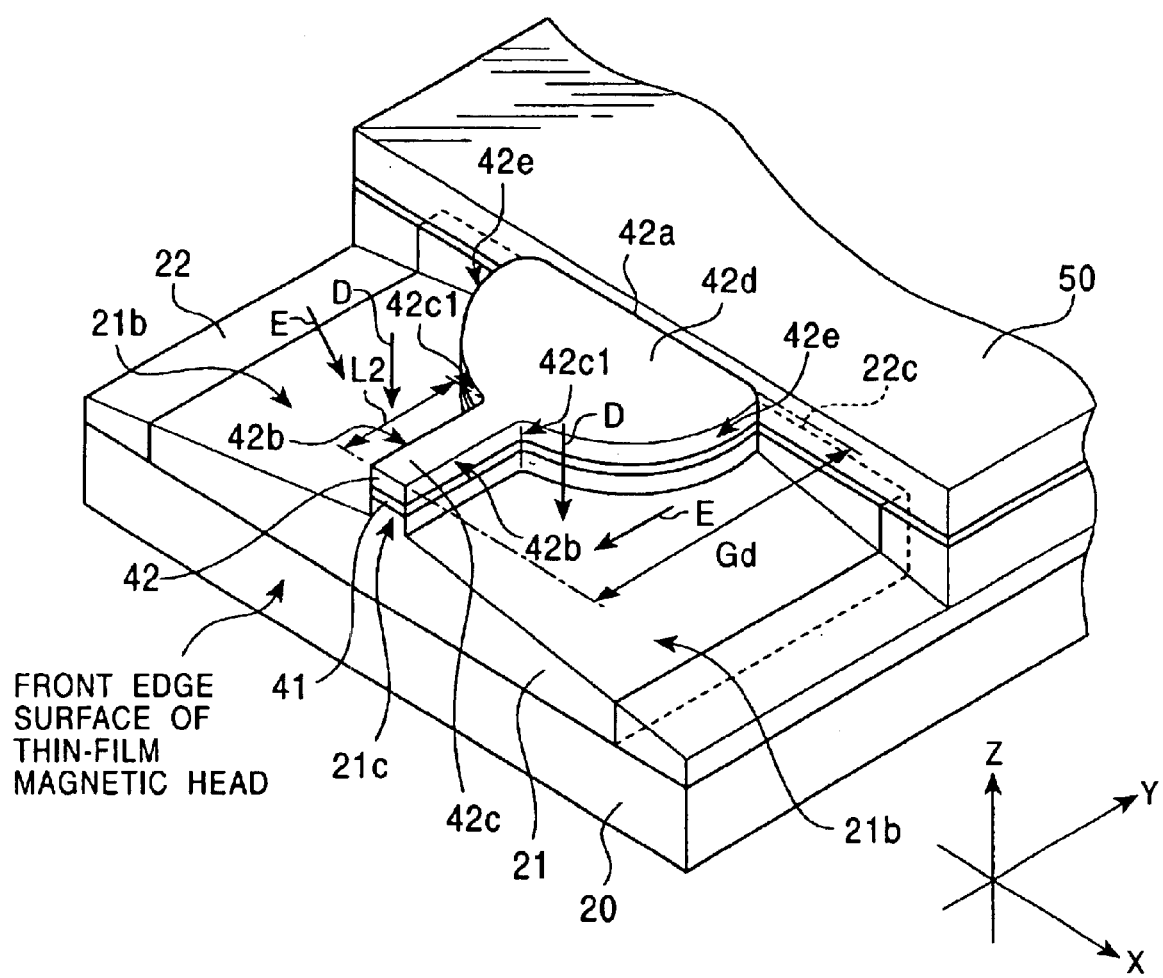
FIG. 7 is a partial perspective view of the thin-film magnetic head shown in FIG. 3.

In the embodiment shown in FIG. 3, the second upper core layer 42 is formed by plating, then depth trimming and side trimming are carried out. The steps are illustrated in FIG. 7, which is a partial perspective view of the thin-film magnetic head shown in FIG. 3. As shown in FIG. 7, the portion toward the rear in the height direction (direction Y in the drawing) from the rear edge surface 42a of the second upper core layer 42 is covered by a mask layer 50 made of a resist or the like. As described above, the rear edge surface 42a of the second upper core layer 42 is positioned closer to the front edge surface of the thin-film magnetic head than the rear edge surface 21a of the second lower core layer 21. Hence, by covering the portion beyond the rear edge surface 42a of the second upper core layer 42 in the height direction (direction Y in the drawing) with the mask layer 50, a rear region 22c of the insulating material layer 22 extending beyond the second lower core layer 21 in the height direction will be completely covered by the mask layer 50.

Thus, the rear region 22c of the insulating material layer 22 will not be trimmed by ion milling in a depth trimming step or a side trimming step. In the depth trimming step, the gap layer 41 exposed on both sides in the track width direction (direction X in the drawing) of the second upper core layer 42 and the second lower core layer 21 are partly trimmed by ion milling that has milling direction D from a direction substantially perpendicular to the top surface of the first lower core layer 20 (direction Z in the drawing) so as to form a projection 21c, which juts out toward the second upper core layer 42, on the second lower core layer 21. In the side trimming step, both side edge surfaces 42b of the second upper core layer 42 are trimmed by ion milling that has milling direction E aslant with respect to the direction perpendicular to the top surface of the first lower core layer 20 so as to further reduce the width of the second upper core layer 42 in the track width direction for achieving compatibility with narrower tracks. Thus, the embodiment does not pose the problem with the prior art in which an adherent film composed of the insulating elements flying from the rear region 22c trimmed by the ion milling sticks to the both side edge surfaces 42b of the second upper core layer 42.

Figure 5:
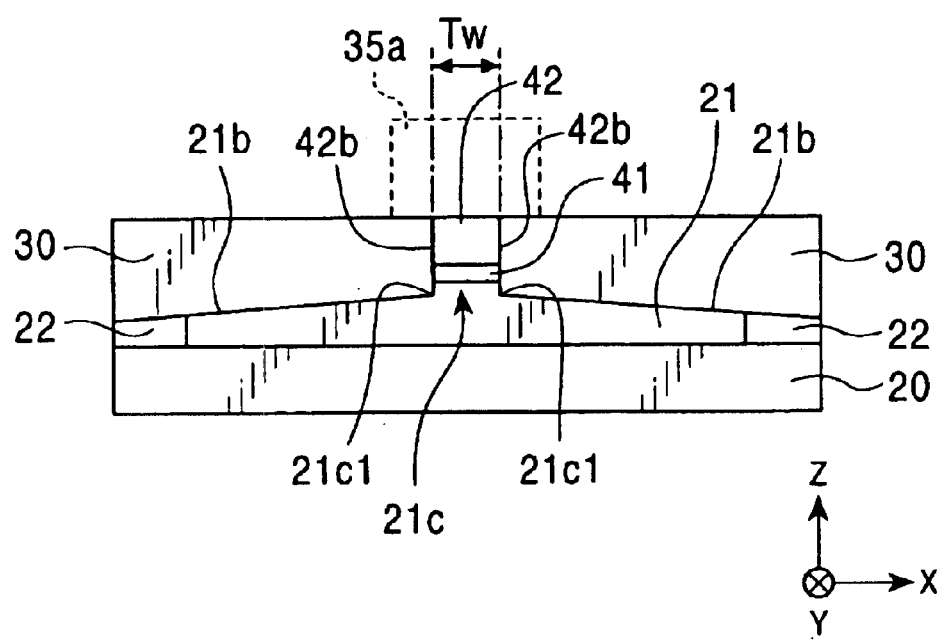
FIG. 5 is a partial front view of the thin-film magnetic head shown in FIG. 3.

The present invention therefore allows the track width portion of the second upper core layer 42 to be formed with a predetermined configuration of a predetermined width, and the intensity of the recording magnetic field leaking from the vicinity of the gap can be therefore stably increased. This makes it possible to fabricate a thin-film magnetic head capable of successfully achieving a higher recording density even with a narrower track design. Referring to FIG. 5 showing the thin-film magnetic head shown in FIG. 3 from the front edge surface of the thin-film magnetic head or from the front side, both side edge surfaces 42b of the second upper core layer 42 are formed to be vertical surfaces that extend in the vertical direction (direction Z in the drawing) from the top surface of the first lower core layer 20. Alternatively, however, both side edge surfaces 42b may be formed of slant surfaces or curved surfaces whose widths in the track width direction (direction X in the drawing) gradually increase toward the distal end portion 35a of the first upper core layer 35. In the invention, there is no particular restrictions on the configuration of the both side edge surfaces 42b as long as they are not wavy like the both side edge surfaces of the second upper core layer in the conventional example shown in FIG. 19.

Referring to FIG. 5 and FIG. 7, the both symmetrical surfaces 21b of the second lower core layer 21 that are formed in the track width direction (direction X in the drawing) from the proximal ends 21c1 of the projection 21c formed on the second lower core layer 21 are constructed of slant surfaces or curved surfaces in which the thickness of the second lower core layer 21 gradually decreases as the distance in the track width direction from the projection 21c increases. The slant surfaces or the curved surfaces are formed by the side trimming in direction E shown in FIG. 7.

In this embodiment, as shown in FIG. 7, the second upper core layer 42, the gap layer 41 located thereunder, and the projection 21c are constructed of a distal end portion 42c and a rear end portion 42d. The distal end portion 42c is formed in the height direction (direction Y in the drawing) from the front edge surface of the thin-film magnetic head, the distal end portion 42c having a predetermined width in the track width direction (direction X in the drawing). The width of the rear end portion 42d in the track width direction (direction X in the drawing) increases toward the rear in the height direction (direction Y in the drawing) from proximal ends 42c1 of the distal end portion 42c. Both side edge surfaces 42b of the distal end portion 42c may be formed of slant surfaces or curved surfaces whose widths in the track width direction (direction X in the drawing) slightly increase in the height direction from the front edge surface.

In the embodiment shown in FIG. 7, the gap depth (Gd) is determined by the distance in the height direction (direction Y in the drawing) from "the front edge surface of the thin-film magnetic head" of the second upper core layer 42 to the rear edge surface 42a. In this embodiment, the proximal ends 42c1 of the distal end portion 42c providing the straight portion of the second upper core layer 42 can be positioned closer to the front edge surface of the thin-film magnetic head than the rear end of the gap depth is. This arrangement makes it possible to form a straight portion (the distal end portion 42c) that is shorter than the gap depth (Gd) on the second upper core layer 42. Preferably, a length L2 of the distal end portion 42c, which provides the straight portion, in the height direction (direction Y in the drawing) ranges from 0.3 $\mu$m to 1.2 $\mu$m.

When the proximal ends 42c1 of the distal end portion 42c, which provides the straight portion, is positioned closer to the front edge surface of the thin-film magnetic head than the rear end of the gap depth (Gd) is, as described above, it is possible to make the second upper core layer 42 resistant to magnetic saturation, thus permitting overwrite characteristic and other characteristics to be easily improved.

Referring to FIG. 7, the rear end portion 42d of the second upper core layer 42 is shaped such that its width in the track width direction (direction X in the drawing) increases in the height direction (direction Y in the drawing). With this arrangement, a larger area of the top surface of the rear end portion 42d can be secured, permitting a larger area of contact with the upper core layer 35. Preferably, the width gradually increases. Both side edge surfaces 42e in the track width direction (direction X in the drawing) of the rear end portion 42d may be formed of slant surfaces or curved surfaces, as shown in FIG. 7.

FIG. 8 through FIG. 15 illustrate the steps included in the process of a manufacturing method for the thin-film magnetic head having the configuration shown in FIG. 1. All the figures are partial longitudinal sectional views of the thin-film magnetic head in the manufacturing process.

Figure 8:
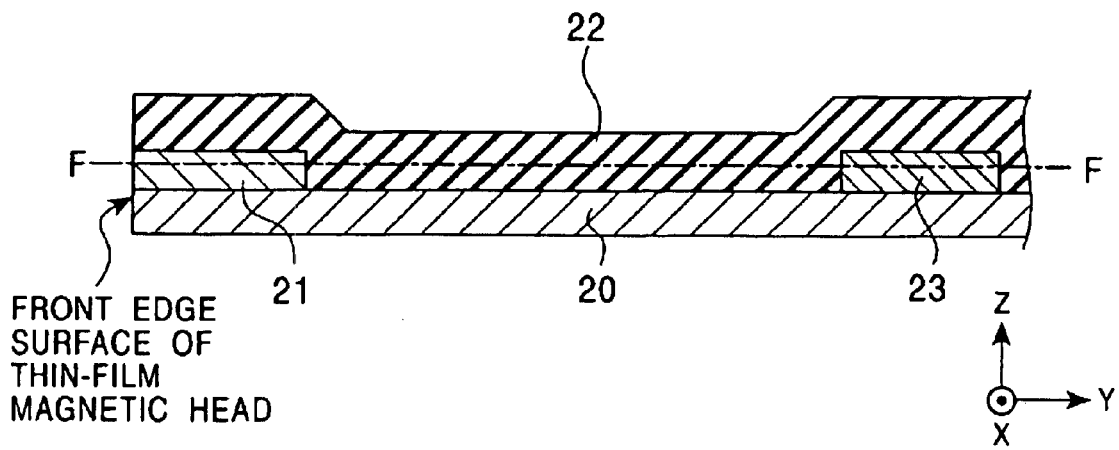
FIG. 8 is a process diagram illustrating a manufacturing method for the thin-film magnetic head shown in FIG. 1 of the present invention.

In the step shown in FIG. 8, the first lower core layer 20 made of a magnetic material, such as a NiFe-based alloy, is formed by plating, then the second lower core layer 21 is deposited on the first lower core layer 20 over a predetermined length in the height direction (direction Y in the drawing) from the front edge surface of the thin-film magnetic head. The second lower core layer 21 is formed by, for example, plating. The position of the front edge surface of the thin-film magnetic head shown in FIG. 8 is different from the position of the front edge surface of the thin-film magnetic head shown in FIG. 1. More specifically, in the final step shown in FIG. 15, the front edge surface of the thin-film magnetic head is trimmed in the height direction (direction Y in the drawing) up to surface H—H, and this surface provides the front edge surface of the thin-film magnetic head shown in FIG. 1.

In the step shown in FIG. 8, the first back gap layer 23 is preferably deposited on the first lower core layer 20 at the same time when the second lower core layer 21 is deposited. The first back gap layer 23 is preferably deposited by plating as in the case of the second lower core layer 21.

Then, the insulating material layer 22 made of an insulating material, such as $Al_2O_3$ or $SiO_2$, is deposited over the second lower core layer 21, the first lower core layer 20, and the first back gap layer 23 by sputtering or vapor deposition.

Figure 9:
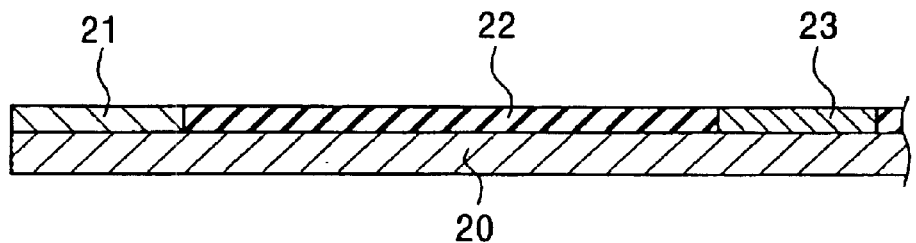
FIG. 9 is a process diagram illustrating a step carried out after the step shown in FIG. 8.

Next, the insulating material layer 22, the second lower core layer 21, and the first back gap layer 23 are trimmed up to surface F—F shown in FIG. 8 by using, for example, the CMP technique or the like. Thus, the top surfaces of the second lower core layer 21, the insulating material layer 22, and the first back gap layer 23 are formed to be flush, as shown in FIG. 9.

Figure 10:
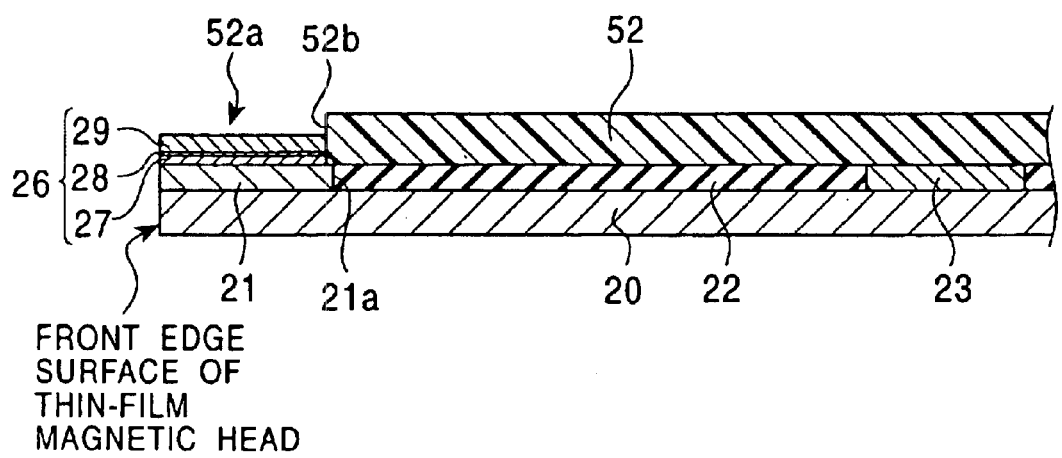
FIG. 10 is a process diagram illustrating a step carried out after the step shown in FIG. 9.

In the step shown in FIG. 10, a resist layer 52 is deposited on the second lower core layer 21, the insulating material layer 22, and the first back gap layer 23, then a pattern 52a having the configuration of the magnetic pole laminate 26 is formed on the portion of the resist layer 52 that is adjacent to the front edge surface of the thin-film magnetic head by exposure and development.

Conventionally, the Gd defining layer has been provided under the magnetic pole laminate 26, posing a shortcoming in that the volume of especially the rear end portion of the upper magnetic pole layer constituting the magnetic pole laminate 26 suddenly reduces, thus requiring the resist layer 52 be formed thickly to produce a thicker pattern 52a so as to secure a predetermined volume of the upper magnetic pole layer. In the present invention, no Gd defining layer is provided, so that there should be no such shortcoming described above, making it easier to secure a predetermined volume of the upper magnetic pole layer 29 making up the magnetic pole laminate 26 even if the resist layer 52 is formed to be thinner.

According to the present invention, therefore, the resist layer 52 can be formed to be thinner, the thickness specifically ranging from 2.5 µm to 4.5 µm. This makes it possible to improve the pattern accuracy for exposure and development, and to form the pattern 52a having the configuration of the magnetic pole laminate 26, which is to be formed on the resist layer 52, in a predetermined size to accommodate narrower tracks.

In this step, the pattern 52a is preferably formed such that a rear edge surface 52b of the pattern 52a is positioned closer to the front edge surface of the thin-film magnetic head than the rear edge surface 21a of the second lower core layer 21 is.

After the pattern 52a is formed on the resist layer 52 by exposure and development, a lower magnetic pole layer 27, a gap layer 28, and an upper magnetic pole layer 29 are successively formed in the pattern 52a by plating in this order from bottom to top. In the present invention, the total thickness of the magnetic pole laminate 26 preferably ranges from 2.0 µm to 4.0 µm. Thus, the invention allows the total thickness of the magnetic pole laminate 26 to be reduced.

In the invention, the gap layer 28 is deposited also by plating; therefore, the gap layer 28 is preferably formed using a nonmagnetic conductive material compatible with plating. To be more specific, the gap layer 28 is preferably formed using a nonmagnetic conductive material composed of one or two or more of NiP, NiPd, NiW, NiMo, Au, Pt, Rh, Pd, Ru, and Cr. According to the invention, it is especially preferable to use NiP, among the above nonmagnetic conductive elements, for the gap layer 28, because NiP has outstanding characteristics. For example, NiP exhibits appropriate nonmagnetic properties, depending upon composition ratios, permits easy flattening of surfaces, and makes it possible to maintain good crystallinity of the upper magnetic pole layer 29 deposited on the gap layer 28.

After depositing the magnetic pole laminate 26 by plating, the resist layer 52 is removed.

Then, according to the invention, as shown in FIG. 6 explained above, the mask layer 50 made of a resist or the like is provided at the rear in the height direction (direction Y in the drawing) of the magnetic pole laminate 26. Both side edge surfaces 26b and 26b in the track width direction (direction X in the drawing) of the magnetic pole laminate 26 are subjected to side trimming in direction C in the drawing so as to further reduce the width of the magnetic pole laminate 26 in the track width direction, thereby adjusting the track width Tw determined by the width of the upper magnetic pole layer 29 in the track width direction to a predetermined width range. The track width Tw preferably ranges from 0.1 µm to 0.5 µm.

In the invention, the rear edge surface 26a of the magnetic pole laminate 26 is positioned closer to the surface opposing a recording medium than the rear edge surface 21a of the second lower core layer 21 is, and the rear edge surface 26a of the magnetic pole laminate 26 is covered by the mask layer 50 when side trimming is carried out. This arrangement minimizes the chance of the insulating material layer 22 being trimmed during the side trimming, and therefore, the inconvenience can be avoided in which the adherent film of insulating elements constituting the insulating material layer 22 sticks to the both side edge surfaces 26b of the magnetic pole laminate 26. Thus, the magnetic pole laminate 26 can be formed to have a predetermined track width configuration and a predetermined track width Tw.

Preferably, after the magnetic pole laminate 26 is formed by plating, a second back gap layer 31 is deposited using a resist layer (not shown) on the first back gap layer 23.

Figure 11:
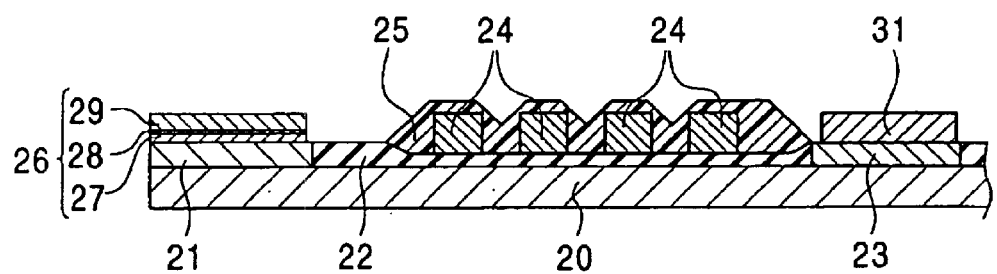
FIG. 11 is a process diagram illustrating a step carried out after the step shown in FIG. 10.

In the step shown in FIG. 11, the top surface portion of the insulating material layer 22 sandwiched between the second lower core layer 21 and the first back gap layer 23 is trimmed by etching or the like to form a coil accommodating groove 22b in the surface of the insulating material layer 22. At this time, the top surfaces of the magnetic pole laminate 26 and the second back gap layer 31 are covered by a resist layer to protect them from the etching. The coil accommodating groove 22b may be formed, for example, before depositing the magnetic pole laminate 26, following the step illustrated in FIG. 9. As another alternative, the coil accommodating groove 22b may not be formed.

Then, a first coil layer 24 is pattern-formed in the coil accommodating groove 22b, and the gaps between the conductor portions of the first coil layer 24 are filled with a coil insulating layer 25 formed of a resist or the like. Furthermore, the first coil layer 24 is covered with the coil insulating layer 25.

Figure 12:
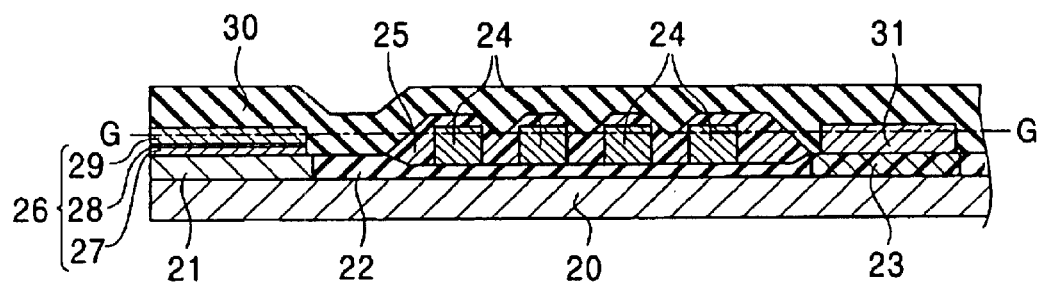
FIG. 12 is a process diagram illustrating a step carried out after the step shown in FIG. 11.

In the step illustrated in FIG. 12, an insulating layer 30 formed of an insulating material, such as $Al_2O_3$ or $SiO_2$, is deposited all over the magnetic pole laminate 26, the coil insulating layer 25, and the second back gap layer 31 by sputtering or vapor deposition.

Figure 13:
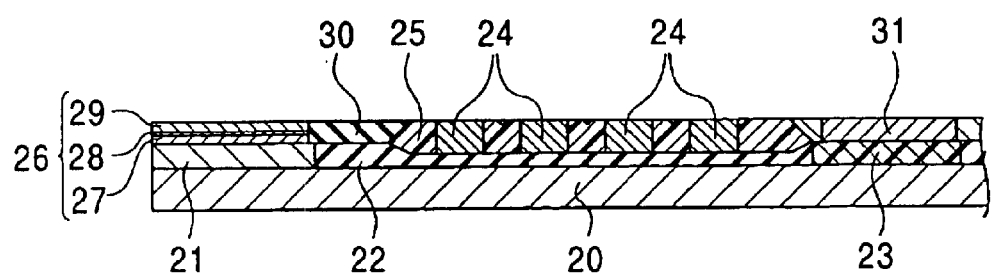
FIG. 13 is a process diagram illustrating a step carried out after the step shown in FIG. 12.

Subsequently, the upper magnetic pole layer 29, the first coil layer 24, the insulating layer 30, the coil insulating layer 25, and the second back gap layer 31 are trimmed to plane G—G by the CMP technique or the like until their top surfaces are flush. The structure of the thin-film magnetic head upon the completion of the trimming is shown in FIG. 13.

Figure 14:
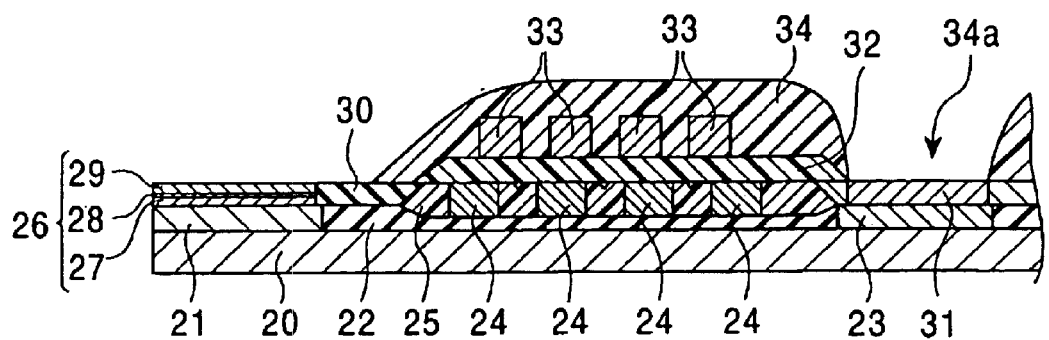
FIG. 14 is a process diagram illustrating a step carried out after the step shown in FIG. 13.

In the step shown in FIG. 14, an organic insulating layer 32 formed of a resist or the like is deposited on the first coil layer 24 and the coil insulating layer 25, then a second coil layer 33 is pattern-formed on the organic insulating layer 32. Furthermore, the second coil layer 33 is covered by an organic insulating layer 34 made of a resist or the like. At this time, a hole 34a reaching the second back gap layer 31 is formed in the organic insulating layer 34.

Figure 15:
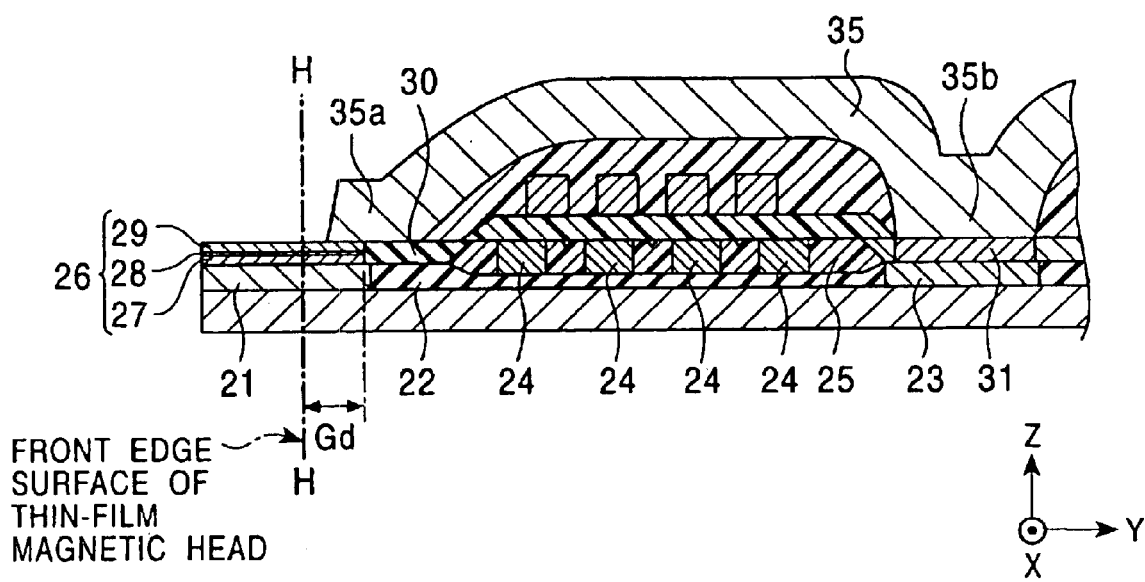
FIG. 15 is a process diagram illustrating a step carried out after the step shown in FIG. 14.

Next, in the step shown in FIG. 15, an upper core layer 35 is formed by, for example, the flame plating method or the like, over a part of the upper magnetic pole layer 29, the organic insulating layer 34, and the second back gap layer 31 exposed through the hole 34a formed in the organic insulating layer 34. This makes it possible to magnetically connect a distal end portion 35a of the upper core layer 35 onto the upper magnetic pole layer 29, and a proximal end portion 35b of the upper core layer 35 onto the second back gap layer 31.

Then, as shown in FIG. 15, the distal end portion of the thin-film magnetic head that is adjacent to a recording medium is trimmed up to plane H—H so as to adjust the gap depth (Gd), which is determined by the length of the magnetic pole laminate 26 in the height direction (direction Y in the drawing), to a predetermined length range. Plane H—H of the thin-film magnetic head shown in FIG. 15 provides the front edge surface of the thin-film magnetic head shown in FIG. 1.

Upon completion of the trimming up to plane H—H shown in FIG. 15, the thin-film magnetic head having the structure shown in FIG. 1 is completed.

To fabricate the thin-film magnetic head shown in FIG. 2, after the steps illustrated in FIGS. 8 and 9, the rear edge surface 52b of the pattern 52a is positioned farther to the rear in the height direction (direction Y in the drawing) than the rear edge surface 21a of the second lower core layer 21 when the pattern 52a of the configuration of the magnetic pole laminate 26 is formed on the resist layer 52 in the step shown in FIG. 10. Thus, by forming the magnetic pole laminate 26 in the pattern 52a by plating, the magnetic pole laminate 26 being constituted by the lower magnetic pole layer 27, the gap layer 28, and the upper magnetic pole layer 29 laminated in this order from bottom to top, the rear edge surface 26a of the magnetic pole laminate 26 is positioned farther toward the rear in the height direction (direction Y in the drawing) than the rear edge surface 21a of the second lower core layer 21, as shown in FIG. 2. Thereafter, the step shown in FIG. 11 through the step shown in FIG. 15 are carried out to complete the thin-film magnetic head having the structure shown in FIG. 2.

To fabricate the thin-film magnetic head shown in FIG. 3, the steps shown in FIGS. 8 and 9 are carried out first, then a gap layer 41 composed of $Al_2O_3$ or $SiO_2$ or the like is deposited on the second lower core layer 21 and the insulating material layer 22 shown in FIG. 9 by sputtering or vapor deposition or the like.

Next, the second upper core layer 42 is deposited by plating on the gap layer 41 by using a resist layer. At this time, the second upper core layer 42 is deposited such that a rear edge surface 42a of the second upper core layer 42 is positioned closer to the front edge surface of the thin-film magnetic head than the rear edge surface 21a of the second lower core layer 21 is.

Thereafter, as already explained in conjunction with FIG. 7, the gap layer 41 exposed on both sides of the second upper core layer 42 in the track width direction (direction X in the drawing) and a part of the second lower core layer 21 are trimmed by depth trimming in direction D shown in the drawing so as to provide the second lower core layer 21 with the projection 21c jutting out toward the second upper core layer 42. Then, the both side edge surfaces of the second upper core layer 42, the gap layer 41, and the projection 21c are trimmed by the side trimming in direction E shown in the drawing so as to set the track width Tw, which is determined by the width of the second upper core layer 42 in the track width direction, to a predetermined dimensional range. After that, the same steps as those of FIG. 11 through FIG. 15 are carried out.

In the thin-film magnetic head having the structure shown in FIG. 1, the magnetic pole laminate 26 may be constituted by two layers, namely, the gap layer 28 and the upper magnetic pole layer 29. In this case, it is preferable to carry out depth trimming also and provide the second lower core layer 21 with a projection so as to fabricate a thin-film magnetic head capable of effectively preventing side fringing.

Thus, the thin-film magnetic head in accordance with the present invention is built in a magnetic head device installed in, for example, a hard disk apparatus. The thin-film magnetic head may be incorporated in either a flying magnetic head device or a contact magnetic head device. The thin-film magnetic head can be used with a magnetic sensor or the like in addition to a hard disk apparatus.

What is claimed is:

1. A thin-film magnetic head comprising:
   a first lower core layer;
   a second lower core layer deposited on the first lower core layer for a predetermined length from a front edge surface of the thin-film magnetic head in a height direction;
   an insulating layer deposited on a region of the second lower core layer, the region being at a rear in the height direction;
   a magnetic pole laminate deposited one of on the second lower core layer and on the second lower core layer and the insulating layer for a predetermined length from the front edge surface at the rear in the height direction, the magnetic pole laminate being one of formed of a lower magnetic pole layer, a gap layer, and an upper magnetic pole layer deposited in this order from bottom to top and formed of the gap layer and the upper magnetic pole layer in this order from bottom to top; and
   an upper core layer deposited on the upper magnetic pole layer;
   a rear edge surface of the magnetic pole laminate is positioned closer to the front edge surface than a rear edge surface of the second lower core layer is.

2. The thin-film magnetic head according to claim 1, wherein a rear edge surface of the magnetic pole laminate is formed of a vertical surface extending in a direction perpendicular to a surface of the second lower core layer.

3. The thin-film magnetic head according to claim 1, wherein one of the magnetic pole laminate and a second upper core layer is constructed of a distal end portion formed in the height direction from the front edge surface to have a predetermined width in a track width direction, and a rear end portion having a width that increases in the track width direction from a proximal end of the distal end portion as the distance in the height direction increases.

4. The thin-film magnetic head according to claim 1, wherein the gap layer is formed of a nonmagnetic conductive material.

5. The thin-film magnetic head according to claim 4, wherein the gap layer is formed of at least one of NIP, NiPd, NiW, NiMo, Au, Pt, Rh, Pd, Ru, and Cr.

6. The thin-film magnetic head according to claim 1, wherein a coil accommodating groove is formed in the insulating layer, a coil layer is provided in the coil accommodating groove, and a top surface of the coil layer and one of a top surface of the magnetic pole laminate and a second upper core layer are flush with each other.

7. A thin-film magnetic head comprising:
a first lower core layer;
a second lower core layer deposited on the first lower core layer over a predetermined length in a height direction from a front edge surface of the thin-film magnetic head;
an insulating layer deposited on a region of the second lower core layer, the region being at a rear in the height direction;
a gap layer deposited on the second lower core layer;
a second upper core layer deposited on the gap layer over a predetermined length toward the rear in the height direction from the front edge surface; and
a first upper core layer deposited on the second upper core layer,
wherein a rear edge surface of the second upper core layer is positioned closer to the front edge surface than a rear edge surface of the second lower core layer is; one of a magnetic pole laminate and the second upper core layer is constructed of a distal end portion formed in the height direction from the front edge surface to have a predetermined width in a track width direction, and a rear end portion having a width that increases in the track width direction from a proximal end of the distal end portion as the distance in the height direction increases.

8. The thin-film magnetic head according to claim 7, wherein the rear edge surface of the second upper core layer is formed of a vertical surface extending in a direction perpendicular to a top surface of the second lower core layer.

9. The thin-film magnetic head according to claim 7, wherein a coil accommodating groove is formed in the insulating layer, a coil layer is provided in the coil accommodating groove, and a top surface of the coil layer and a top surface of one of a magnetic pole laminate and the second upper core layer are flush with each other.

* * * * *

UNITED STATES PATENT AND TRADEMARK OFFICE
CERTIFICATE OF CORRECTION

PATENT NO. : 6,898,055 B2
DATED : May 24, 2005
INVENTOR(S) : Kiyoshi Sato et al.

It is certified that error appears in the above-identified patent and that said Letters Patent is hereby corrected as shown below:

<u>Column 25,</u>
Line 10, after "at least one of" delete "NIP," and insert -- NiP, --.

Signed and Sealed this

Fourth Day of April, 2006

JON W. DUDAS
*Director of the United States Patent and Trademark Office*